US012584878B2

(12) United States Patent
Alvarez et al.

(10) Patent No.: US 12,584,878 B2
(45) Date of Patent: Mar. 24, 2026

(54) CARBON NANOTUBE ELECTROCHEMICAL SET AS LAB-ON-A-CHIP

(71) Applicant: University of Cincinnati, Cincinnati, OH (US)

(72) Inventors: Noe Alvarez, Cincinnati, OH (US); Pankaj Gupta, Cincinnati, OH (US)

(73) Assignee: University of Cincinnati, Cincinnati, OH (US)

( * ) Notice: Subject to any disclaimer, the term of this patent is extended or adjusted under 35 U.S.C. 154(b) by 181 days.

(21) Appl. No.: 18/274,284

(22) PCT Filed: Jan. 28, 2022

(86) PCT No.: PCT/US2022/014236
§ 371 (c)(1),
(2) Date: Jul. 26, 2023

(87) PCT Pub. No.: WO2022/165126
PCT Pub. Date: Aug. 4, 2022

(65) Prior Publication Data
US 2024/0118235 A1      Apr. 11, 2024

Related U.S. Application Data

(60) Provisional application No. 63/142,698, filed on Jan. 28, 2021.

(51) Int. Cl.
G01N 27/30          (2006.01)
C01B 32/168        (2017.01)
G01N 27/327        (2006.01)

(52) U.S. Cl.
CPC ......... *G01N 27/308* (2013.01); *C01B 32/168* (2017.08); *G01N 27/3278* (2013.01); *C01B 2202/22* (2013.01); *C01B 2202/36* (2013.01)

(58) Field of Classification Search
None
See application file for complete search history.

(56) References Cited

U.S. PATENT DOCUMENTS

2003/0077515 A1*    4/2003   Chen ..................... H01M 4/364
                                                                524/847
2006/0088945 A1*    4/2006   Douglas ................. C12Q 1/004
                                                                204/450

(Continued)

OTHER PUBLICATIONS

Alvarez, et al., Carbon 144 (2019) 55-62.
Alvarez et al., Carbon 86 (2015) 350-357.

*Primary Examiner* — J. Christopher Ball
(74) *Attorney, Agent, or Firm* — DINSMORE & SHOHL LLP

(57) ABSTRACT

The present disclosure concerns open-end carbon nanotubes assembled as a microelectrode array in electrode sets/microelectrode sets (ES/micro-ES). The ES/micro-ES includes three electrodes that are made of highly densified multi-walled carbon nanotubes fibers (HD-CNTfs) sectioned into rods embedded in an inert polymer film with exposed open ends of CNTs at the electrode-electrolyte interface. The ES/micro-ES provide miniature electrochemical sensing devices in which all electrodes are based on carbon nanomaterials. The combination of dimensions and orientation provides for highly sensitive electrochemical determination (picomolar) of different electroactive analytes in different electrolyte mediums, where even a single drop of desired analyte solution will be enough for electrochemical characterization.

20 Claims, 16 Drawing Sheets

(56) References Cited

U.S. PATENT DOCUMENTS

| | | | | |
|---|---|---|---|---|
| 2014/0127586 A1* | 5/2014 | Kamizono | ............. | B82Y 40/00 |
| | | | | 428/221 |
| 2014/0294672 A1* | 10/2014 | Meyerhoff | .......... | A61M 1/3462 |
| | | | | 422/44 |
| 2017/0299542 A1* | 10/2017 | Amouzadeh Tabrizi | ................... | |
| | | | | G01N 33/0052 |
| 2017/0363563 A1* | 12/2017 | Alvarez | ................ | G01N 27/42 |

* cited by examiner

FIG. 3A                    FIG. 3B
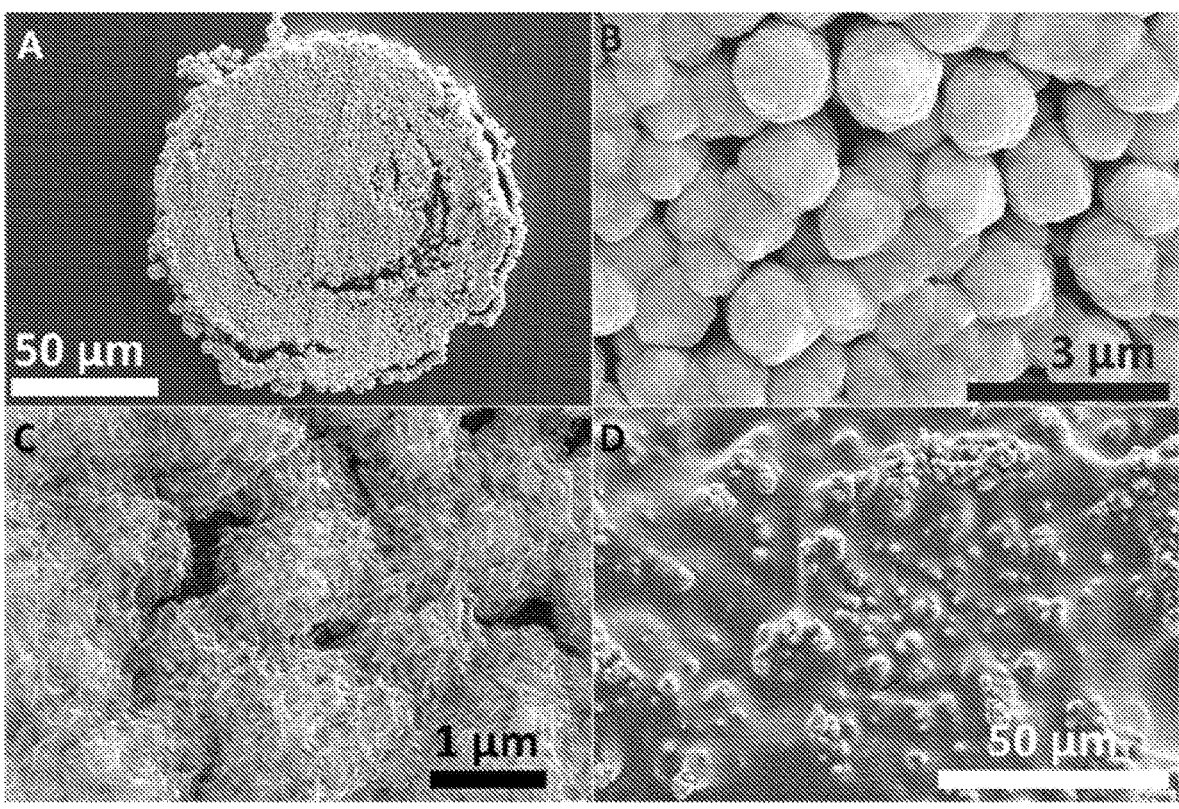
FIG. 3C                    FIG. 3D

FIG. 6 A
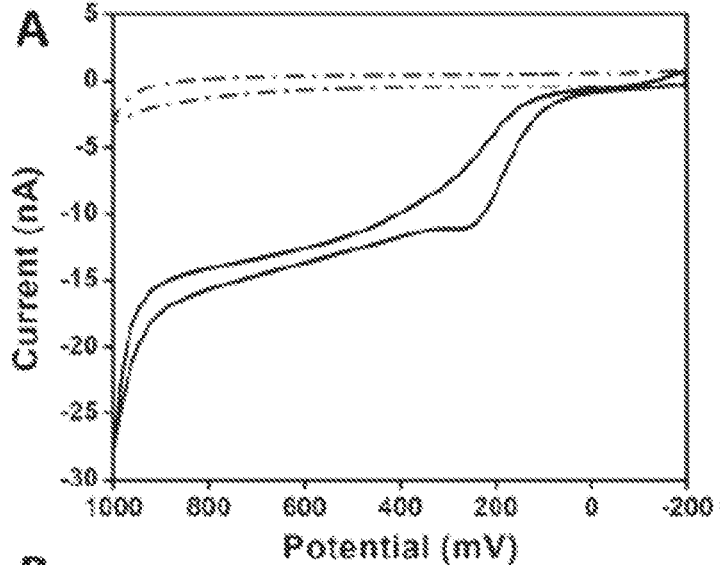
FIG. 6 B
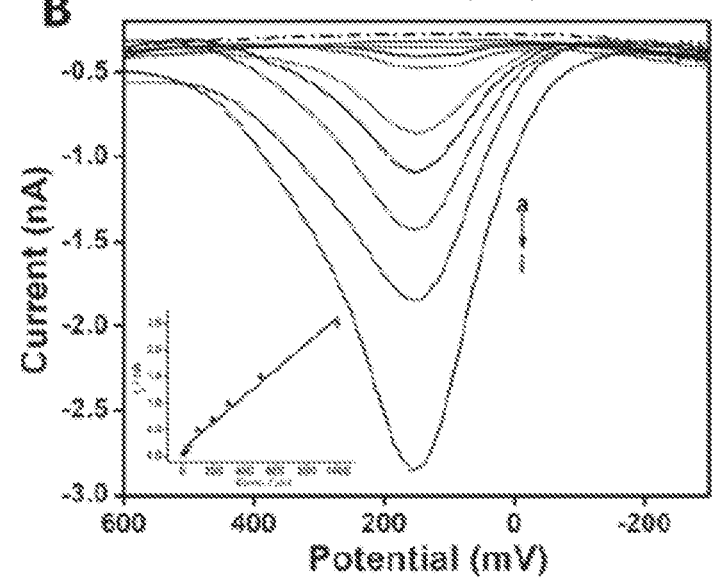
FIG. 6 C
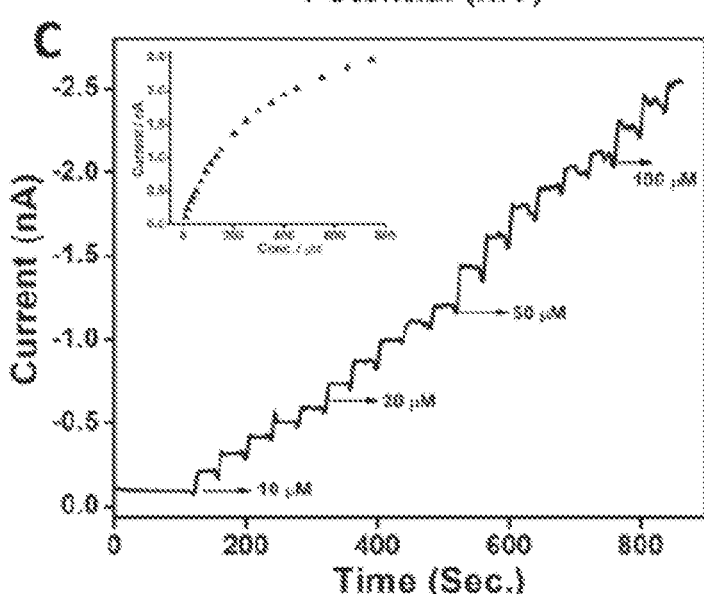

A

B

CARBON NANOTUBE ELECTROCHEMICAL SET AS LAB-ON-A-CHIP

CROSS-REFERENCE TO RELATED APPLICATIONS

This application is a § 371 National Stage Application of International Patent Application Serial No. PCT/US2022/014236, filed on Jan. 28, 2022, which claims priority to U.S. Provisional Patent Application Ser. No. 63/142,698, filed on Jan. 28, 2021, the entire disclosures of which are hereby incorporated by reference.

TECHNICAL FIELD

The present disclosure concerns open-end carbon nanotubes assembled as a microelectrode array in a Lab-on-a-Chip (LOC) format. It includes three electrodes that are made of highly densified multi-walled carbon nanotubes fibers (HD-CNTf) sectioned into rods embedded in an inert polymer film with exposed open ends of CNTs at the electrode-electrolyte interface. The assembled chip provides a miniature electrochemical sensing device in which all electrodes are based on carbon nanomaterials. The combination of dimensions and orientation provides for highly sensitive electrochemical determination (picomolar) of different electroactive analytes in different electrolyte mediums, where even a single drop of desired or target analyte solution is sufficient for electrochemical characterization.

BACKGROUND

Individual carbon nanotubes (CNTs) are cylindrical nanoscale structures that are several nanometers in diameter but can be of hundreds of microns, even multiple millimeters in length. CNTs possess remarkable characteristics, such as high electrical conductivity, thermal stability, good chemical and environmental stability, low density and high tensile strength that offer CNTs to be considered as a material possessing superior qualities with the potential to revolutionize material development fields. In addition, CNTs are identified as excellent electrical materials due to facets such as their high aspect ratio, nanometer dimensions, fast electron transfer rate, ample electroactive sites, biocompatibility, and corrosion resistance. As a result, CNTs have been employed as an electrode material in a wide range of sensing applications. A significant growth has been observed over the past two decades in CNT technology, where several groups reported on randomly dispersed or drop coating of CNTs on macro carbon (glassy carbon, graphite), gold (Au), and platinum (Pt) surfaces, dispersing CNTs with different binders, CNT paste, screen printing with CNTs, CNT paper, CNT composite, and CNT abrasion attachments employed as possible electrodes for electrochemical detection of wide range of redox-active molecules. These studies reported that CNT-based electrodes were able to reduce overpotential with fast electron transfer kinetics and increased peak current response to analytes compared to bare surface to provide high sensitivity and selectivity.

CNTs arranged parallel to each other into fibers and arrays can take advantage of the nanoscale properties while also taking advantage of their microscale nature to assemble sensor devices. In comparison to randomly-arranged CNT-based electrodes, highly ordered or aligned CNT electrodes present high mass sensitivity, faster mass transport, are suitable for lower solution resistance, and normally generate high signal-to-noise ratio resulting in much lower background current and improved detection limits. Alignment of CNTs within a fiber inherits the advantage of large specific surface area and electrocatalytic activity of CNTs and helps to exploit the anisotropic properties of individual CNTs. In addition, CNT fibers are superior for real time monitoring of neurotransmitters and their metabolites in live brain tissues with improved spatiotemporal resolution. The high surface roughness and presence of oxygen functionalities on dangling $sp^3$ hybridized carbons of edge-planes of the CNT fiber provides resistance to fouling, allowing increased sensitivity and reproducibility over a long period of time.

Screen printed electrodes (SPEs) have attracted significant interest and now screen-printing techniques are established as a reliable method for construction of electrochemical and biosensors. Due to their low cost, ease, and speed of mass production, SPEs are extensively employed for developing novel sensing platforms for wide variety of applications. In SPEs, all three electrodes are printed on a flexible substrate with counter and reference electrodes printed using silver (Ag) and silver/silver chloride (Ag/AgCl) inks, respectively, and a working electrode mostly printed of carbon ink. As the SPEs lack high sensitivity therefore, working electrodes further modified with conductive surface modifiers, i.e. CNT, graphene, noble and various other nanoparticles, and polymers offer a potential to increase both sensitivity and selectively.

SUMMARY

The present disclosure concerns a micro electrode set ($\mu$-ES) that includes a working electrode (WE), a counter electrode (CE), and a reference electrode (RE). For each of the WE, CE, and RE, all include a carbon nanotube fiber (CNTf) of a cylindrical length and an open circular distal end. Each also can include an insulating substrate covering at least a portion of the cylindrical length up to the open distal end. This can then allow that a solution in contact with the $\mu$-ES does not substantially contact the cylindrical length of the CNTf.

In some aspects, the present disclosure concerns the RE further including a coating layer on the open circular distal end of the CNTf. In some aspects, the coating layer includes silver and silver chloride. In some aspects, the coating layer further includes sodium tetrafluoroethylene.

In some aspects, the CNTfs of the WE, CE, and RE are highly densified CNTFs (HD-CNTfs). In some aspects, the insulating substrate comprises an epoxy. In further aspects, the CNTfs of the WE, CE and RE are embedded within the epoxy. In some aspects, the epoxy is cured or dried.

In some aspects, a proximal end of each of the CNTfs of the WE, CE, and RE is operably connected to an electrochemical sensor. In further aspects, the proximal end is connected to the electrochemical sensor through a silver paste.

In some aspects, the distal end of the WE further includes a copper layer. In further aspects, the copper layer includes copper nanoparticles (NPs).

In some aspects, the CNTf of the WE has a diameter of between 30 $\mu$m and 50 $\mu$m. In other aspects, the CNTf of the CE has a diameter of between 80 $\mu$m and 100 $\mu$m. In other aspects, the CNTf of the RE has a diameter of between 80 $\mu$m and 100 $\mu$m.

In some aspects, the present disclosure concerns methods for detecting the presence of a target analyte in a test sample, by submerging the $\mu$-ES as set forth herein in a solution, with the proximal ends of the WE, CE and RE connected to an electrochemical sensor. In some aspects, the methods further includes adding a volume of the test sample to the solution. Adding the test sample therein allows for the electrochemical sensor to react and a change in the electrochemical sensor confirms the presence of the target analyte in the test sample. In some aspects, the solution may include one or more electrolytes in water.

In certain aspects, the target analyte is selected from dopamine, lead, glucose, furosemide, and β-nicotinamide adenine dinucleotide (NADH).

In some aspects, the methods may also include pre-calibrating the μ-ES to the target analyte. In certain aspects, the μ-ES is pre-calibrated to determine the limiting current at the open distal end of the CNTfs of the WE.

BRIEF DESCRIPTION OF THE DRAWINGS

FIG. 3A shows AgNPs coated 100 μm HD-CNTf rod embedded in inert polymer.

FIG. 3B shows high magnification of image A.

FIG. 3C shows an image after formation of Ag/AgCl layer by drop casting $FeCl_3$.

FIG. 3D shows an image after Nafion™ coating on Ag/AgCl plated HD-CNTf reference electrode.

FIG. 6A shows CV recorded for 5 mM NADH at 100 mV s−1 (solid line).

FIG. 6B shows SWVs for different concentration of NADH (a) 1, (b) 10, (c) 30, (d) 50, (e) 100, (f) 200, (g) 300, (h) 500, (i) 1000 μM.

FIG. 6C shows amperometric response observed for different concentrations of NADH. All data have been recorded in 0.1 M phosphate buffer of pH 7.2 at HD-CNTf ES/μ-ES sensor. Observed calibration plots between [C] and $i_p$ (inset). Blank is shown by dotted line.

DETAILED DESCRIPTION

Figure 1A:
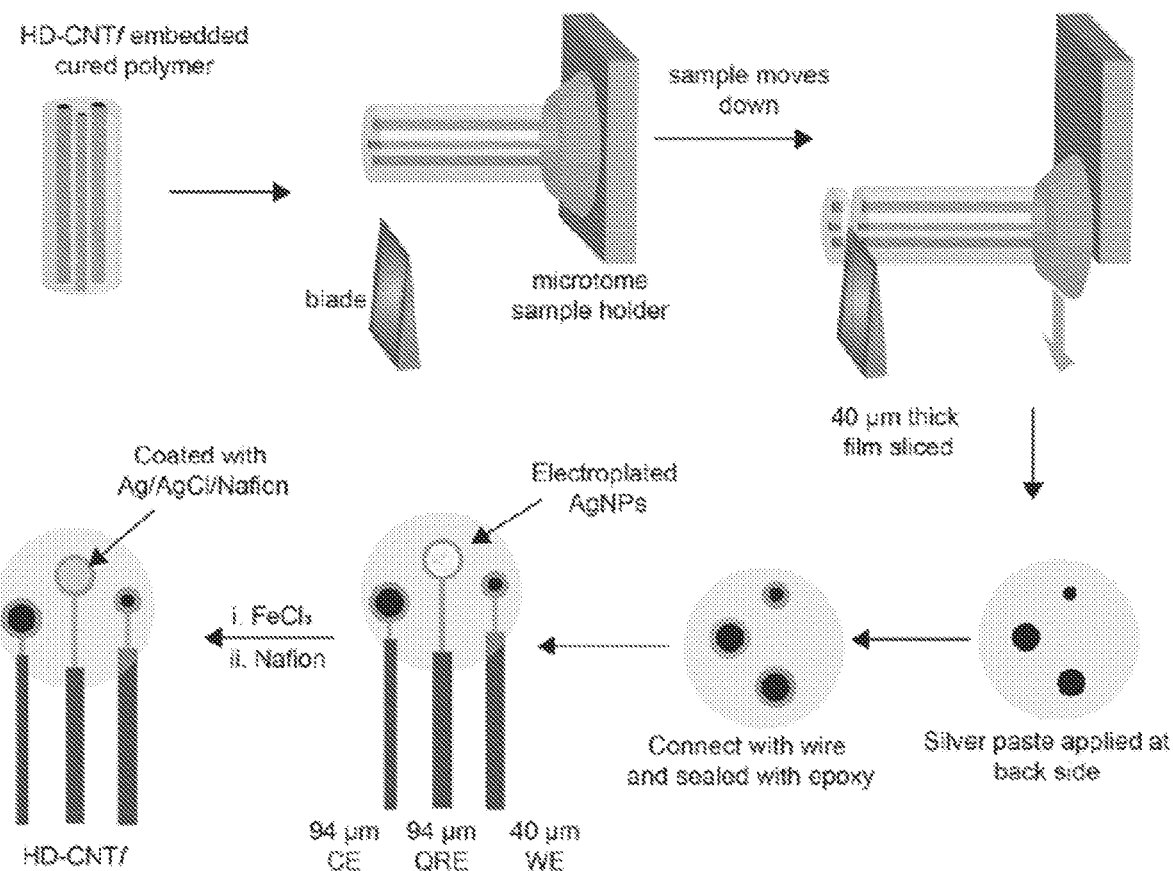
FIG. 1A shows a schematic showing the process involved in the fabrication of HD-CNTf ES/μ-ES microelectrodes. Schematics are not to scale.

The present disclosure concerns microelectrodes on a substrate, wherein each microelectrode includes a fiber or thread of vertically aligned carbon nanotubes (CNTs) wherein one end of the fiber remains open or exposed, such that ends of CNTs can be in open communication with a solution or electrolytes therein. In some aspects, the opposing end of the fiber or thread is operably connected to an electrochemical sensor, either directly or through connection with one of more conductive metals.

In some aspects, the present disclosure concerns a CNT fiber or thread positioned within a substrate to provide an electrode. In some aspects, the CNT fiber is retained within a substrate through adhesion. While it can be appreciated that the substrate is not required for the electrode to be able to detect or conduct an electrical signal, it should be appreciated that retaining the end of the CNT fiber in a fixed position allows for improved consistency.

In some aspects, the substrate retains at least two CNT fibers or threads. It will be appreciated that providing two CNT fibers or threads within a relative proximity to each other where both are connected to the same electrochemical sensor allows for the completion of a circuit and the analysis of a change in electric charge. In some aspects, one electrode may be considered a working electrode (WE) and the other a counter electrode (CE).

In some aspects, the substrate may include at least a third electrode. In some aspects, the third electrode may provide function as a reference electrode (RE) or quasi-reference electrode (QRE/QE). In some aspects, a reference electrode or quasi-reference electrode may not include or possess exposed an open end of an operably connected (to an electrochemical sensor) CNT fiber or thread, but instead may include a coating with a material that possesses a well-known electrode potential, such as silver chloride, copper-copper(II) sulfate, silver, silver oxides, and saturated calomel. In some aspects, the coating is a silver/silver chloride coating. In some aspects the third electrode may include a further coating with sulfonated tetrafluoroethylene (e.g., Nafion™) or ionophores to improve conductivity. In some aspects, the substrate include a third electrode that includes a CNT fiber or thread with one end capped with a coating to provide an established electrode potential, such as a silver/silver chloride/sodium tetrafluoroethylene coating.

The arrangement of the electrode ends on the substrate can be such that they lay across a surface with an end exposed. In other aspects, the CNT fiber or thread can pass through the substrate at a vertical or about vertical angle with respect to a horizontal substrate, such that the CNT fiber(s) or thread(s) pass perpendicularly or about perpendicularly through an outer surface of the substrate. It will be appreciated that in most instances, all electrode ends are on the same side of the substrate, though in some aspects, one or more electrodes may be oriented such that the end thereof is on an opposite surface from a further electrode.

In some aspects, the present disclosure concerns electrodes dispersed on a substrate. In some aspects, the electrode includes an open end of a CNT fiber or thread (CNTf), wherein the CNTs therein are aligned such that the length of each are aligned in parallel or near parallel and the ends thereof aligned. For example, a CNT may possess a cylindrical or near cylindrical shape, and in such instances, the length of the cylinder bodies run along each other, allowing the circular ends to all orient in the same direction.

With respect to the CNT fibers or threads, for the purposes of clarity, each possesses two distinct ends, with a distal end being oriented to receive an electrical signal and a proximal end operably connected to an electrochemical sensor. In some aspects, the body of the CNTf is embedded within a substrate and the distal end of the CNT fiber or thread is exposed with a portion proximal thereto or immediately proximal thereto in connection with the substrate to adhere and/or retain the CNTf thereto. In some aspects, the distal end of the CNTf is coated with a coating to provide an established electrode potential, such as a silver/silver chloride/sodium tetrafluoroethylene coating.

In some aspects, the present disclosure concerns the application of distal ends of CNT fibers or threads as an electrode, such as a working, counter, reference or quasi-reference electrode. In some aspects, the proximal ends of each CNT fiber or thread with a distal end functioning as an electrode are operably connected to an electrochemical sensor, such as a voltmeter, an ammeter, an ohmmeter, a potentiostat, a galvanostat, a bipotentostat, a multimeter, and/or an electrochemical analyzer. In some aspects, the proximal ends of the CNT fibers or threads can be connected to an electrochemical sensor directly or by connecting the proximal end to a conducting wire. For example, as set forth in the Examples herein, the proximal ends can be connected to a metal wire with a silver paste. In some aspects, the connection between a proximal end and a connecting wire can be insulated. In further aspects, the CNT fiber or wire, except for an exposed open end, may be encased in an insulating material or insulating materials. In some aspects, the CNTf is encased within the substrate with the distal end open and the proximal end operably connected to an electrochemical sensor. In some aspects, the connection to the electrochemical sensor is insulated, such as through the substrate, by insulation covering a connecting metal wire and/or added polymer coating to insulate or render the connection to the electrochemical sensor at the proximal end impermeable to a solution in which the assemble electrode set may be submerged.

In some aspects, the CNT fiber or thread is of between about 10 and about 150 μm in thickness or diameter, including about 15, 20, 25, 30, 35, 40, 45, 50, 55, 60, 65, 70, 75, 80, 85, 90, 95, 100, 105, 110, 115, 120, 125, 130, 135, 140, and 145 μm. In some aspects, the CNT fiber or thread is prepared by dry spinning, liquid phase extrusion, and/or gas phase spinning from vertically aligned CNTs grown on a substrate, such as by chemical vapor deposition. The CNTs may be single-walled, multi-walled, or a combination thereof. CNT fibers or threads can be further treated to increase density after dry spinning, such as by soaking in a solvent and/or by rolling under pressure and/or increased pressure and/or temperature. Solvents may include ethanol, methanol, acetone, and/or water. In some aspects, the working electrode is about 30-60% smaller in diameter than the counter electrode, such as 35, 40, 45, 50, or 55% smaller. In some aspects, the reference or quasi reference electrode is of a similar diameter as the counter electrode. As set forth in the Examples below, a CE with an HD-CNTf diameter of ~94 μm, a QRE with an HD-CNTf of 100 μm, and a WE with HD-CNTf with a diameter of ~40 μm were used in some aspects.

In some aspects, the present disclosure concerns an electrode set (ES) or micro-ES (la-ES) that includes at least two electrodes of high-density CNT fiber (HD-CNTf) that are embedded in an inert substrate with distal ends of each exposed on one side of the inert substrate. In some aspects, the present disclosure concerns an ES/μ-ES of at least three electrodes, the third electrode being a HD-CNTf with a coating to provide an established electrode potential, such as a silver/silver chloride/sodium tetrafluoroethylene coating.

In some aspects, the present disclosure concerns a working electrode, a counter electrode, and a reference (or quasi-reference) electrode embedded in a substrate. In some aspects, the substrate is an inert or non-conducting material, such as silicon, silicon derivatives, or polymers. In some aspects, the ES or µ-ES is formed by inserting the distal ends into a liquid polymer (e.g., epoxy resin), or other non-porous polymer, and allowing the liquid to solidify, such as by cooling or cross-linking. With the CNTfs embedded or at least the distal ends thereof embedded, any polymer covering the distal ends of the HD-CNTfs can be removed, such as through cutting or slicing. In some aspects, once the polymer is hardened, an area at least around each distal end of each HD-CNTf can be sliced or shaved to expose an open end thereof, such as through use of a microtome. In some aspects, the HD-CNTfs are embedded in a polymer substrate and then the distal ends are exposed by shaving or slicing a face of the polymer substrate until the distal ends of the HD-CNTfs are exposed (see, e.g., FIG. 1A). In some aspects, the electrode to be designated as the reference or quasi-reference electrode may then be coated as set forth herein. In some aspects, the coating may be performed by applying an optimized reduction potential. For example, as set for in the Examples, silver (Ag) nanoparticles (NPs) are electrochemically coated with silver nitrate in an ammonia solution. The NPs can then be further treated with iron (III) chloride and further coated with sodium tetrafluoroethylene (e.g. Nafion™) to protect the integrity and avoid degradation. In some aspects, the electrodes or HD-CNTfs used as the working and counter electrodes do not feature any additional metal or metal-catalyst. In some further aspects, as described herein, one of the working or counter electrodes may include an additional coating layer, either the same as or different from that on the reference or quasi-reference electrode.

In some aspects, the length of the HD-CNTf is of a relatively short length and need not necessarily extend beyond the other side of the substrate, so long as it is operably connected to an electric or electrochemical sensor. In some aspects, it may be of benefit to ensure that the side of the substrate opposite to the exposed distal ends of the HD-CNTfs is entirely insulated or coated in an insulating material. In some aspects, this same side may be impermeable to liquid to ensure that any measurement occurs from the opposing side of the substrate where the open-ends of the HD-CNTfs can come into contact with a solution, as can the reference or quasi-reference electrode.

In some aspects, the distal end of the HD-CNTf is in the same plane as the substrate or is flush there against. It some aspects, the distal end of the HD-CNTfs may be countersunk within the substrate. It will be appreciated that in some aspects, the only desired point of contact when in application is the open end or coated end of the HD-CNTfs. In some aspects, it may be preferred to ensure that the sidewalls of the HD-CNTfs are not in contact or significantly in contact with a surrounding solution. For example, as set forth herein, the methods of using the ES/µ-ES can include placing such in a solution. In such instances, it may be preferred to ensure that the open end or coated end is the only interface or significant interface with the solution, such that the sidewalls of any NT therein are not able to interfere with the potential or actual signal generated or transduced at the interface. As described herein, the microtome shaving or slicing provides an exemplary approach wherein the substrate and the open end are in the same plane due to repeat slicing across the face of the substrate until the open ends are exposed. It will be appreciated that once exposed, repeated application with the microtome can retain the distal end and the substrate in the same plane due to the even action of the blade therein. Such also minimizes or negates the possibility of the sidewalls interfacing with any solution one the ES/µ-ES is placed therein. With regard to the coating on the reference or quasi-reference electrode, as long as the coating covers the open end completely, the subsequent potential raised nature of this electrode from the surface of the substrate is insignificant with regard to conductivity.

In some aspects, the present disclosure concerns an ES/µ-ES that includes a substrate with a top surface, wherein an open end of a working electrode, a counter electrode and a reference or quasi reference electrode are exposed. In some aspects, the electrodes each include HD-CNTfs as conducting bodies. In some aspects, each electrode passes through the substrate to a bottom surface. In some aspects, each electrode is embedded within the substrate, such as each electrode includes an HD-CNTf embedded in the substrate. In some aspects, at the bottom surface of the substrate each electrode is connected to a metal conductive wire that is operably connected to an electric or electrochemical sensor. In some aspects, the connection can be through a silver paste or similar fusible metal or metal alloy. FIG. 1A identifies both an embodiment of the ES/µ-ES and a series of steps that allows for the formation or fabrication of the same. In some further aspects, the open-end of the reference or quasi-reference electrode may then be further coated by applying a coating layer the cover the open-end at the top surface of the substrate.

In some further aspects, a metal coating may be also applied to one or both of the working or counter electrodes. In some aspects, the metal is copper, gold, platinum, or similar metal depending on the target analyte. The application of copper allows for further detection of sugars, such as glucose. It will be appreciated that the µ-ES sensor set provides a platform that gives higher chances to modify the surface using common organic chemistry. In some aspects, copper NPs are applied to coat the open end of the working electrode. Due to the ability of copper to change valence states, copper-based materials with a variety of dimensionalities and nano/microstructures such as metallic copper, CuxO, $Cu(OH)_2$, and CuxS can be used to fabricate enzyme-free sensing interfaces to catalyze glucose electrooxidation. Owing to the excellent conductivity of the densely packed edge plane sites of the CNT cross-section and the outstanding catalytic ability of the CuNPs, this modified ES/µ-ES exhibits a wide linear range for glucose detection with a very low limit of detection (LOD).

In some aspects, the present disclosure concerns methods of utilizing the ES/µ-ES/LOCs as set forth herein. In some aspects, the methods include placing the assembled ES/µ-ES in a solution and monitoring one or more electrical or electrochemical parameters therein. In some aspects, the voltage or changes therein in the solution can be measured and/or detected with one or more voltammetric techniques including cyclic voltammetry (CV), square wave voltammetry (SWV), amperometry, square wave anodic stripping voltammetry (SWASV), or other electrochemical arrangements. As demonstrated below, the encapsulation of the sidewalls of the HD-CNTfs except for at the electrode-electrolyte interface of the open end of the HD-CNTfs provides excellent sensitivity wherein the presence of low concentrations of biomolecules, heavy metals, sugars, and therapeutics can be readily performed. For example, as set forth below, the ES/µ-ES of the present disclosure can detect the presence of dopamine, β-nicotinamide adenine dinucle-otide, NADH, furosemide, glucose, and lead.

In some aspects, the methods include calibrating or establishing a baseline recording by placing the ES/μ-ES in a solution. In some aspects, it may be useful to calibrate in an electrolyte solution. In some aspects, calibration can be performed using SWV. For example, as set forth in the working examples, a μ-ES was placed in a 1:1 solution of 5 mM Ru(NH$_3$))$_6$Cl$_3$: 50 mM KCl and CVs were obtained at scan rates from 5 to 500 mV s$^{-1}$, in both forward and reverse, to identifying the limiting current, as well as observed over 100 scans at 100 mV s$^{-1}$ to assess stability.

In some aspects, the methods can include identifying or detecting the presence of a foreign or target analyte in a solution by observing a change in electrochemical signal. Values can be established for a desired analyte to calibrate for particular concentrations of an analyte and to establish baseline parameters. A test sample can then be utilized and based on the shift, the level of shift, the type of shift, or the lack of change thereto, a determination of the presence of a target analyte can be determined. For example, as set forth in the Examples, a calibration study was performed with dopamine in a pH 7.2 phosphate and CVs recorded over 5 to 200 mV s$^{-1}$ that provide oxidation and reduction peaks to determine ΔEp and establish the relationship between the peak current, i$_p$, against the scan rate, v. In this model, the limit of detection was identified to be 0.5 nM. As identified in the working Examples, once the calibration of a target analyte is determined, the concentration can be determined based on the change in current at the determined potential.

In some aspects, the methods of detection of a target analyte are specific to the target analyte. As identified herein, the methods of detection are selective for the target. For example, with the calibration for dopamine, tests were performed with potentially interfering analytes of uric acid and ascorbic acid, yet the μ-ES remained selective for the detection of dopamine (see, FIG. 5B). In some aspects, a target analyte is first assessed for determining the nature of the electrochemical reaction between the target analyte and the open ends of the HD-CNTfs of the electrodes to calibrate the ES/μ-ES. After calibration for the electrochemical patterns generated by the electrochemical reaction with the HD-CNTfs, the electrodes can then be utilized to detect and/or measure the presence of target analyte(s) in an unknown or test sample.

In some aspects, the methods concern placing the ES/μ-ES in a solution. In some aspects, the solution is aqueous. In some aspects, the solution includes one or more ions or dissolved salts or electrolytes. In some aspects, the pH of the solution is of from about 4 to 11, including a pH of about 5, 6, 7, 8, 9, or 10. In some aspects, the ES/μ-ES may provide a baseline signal and/or be calibrated to a baseline signal. In some aspects, the ES/μ-ES may be calibrated to a particular target analyte. In some aspects, the ES/μ-ES may be calibrated by adding increasing amount or concentrations of a target analyte. In some aspects, the limiting current may be determined as set forth in the working examples by adjustment with Faraday's constant, the number of electrons per redox event, the diffusion coefficient, the concentration of the solution, and the radius of the HD-CNTf. In some aspects, the ES/μ-ES is calibrated to identify the peak current and scan rate relationship, as well as the peak separation values between readings compared to the RE and/or QRE.

In some aspects, the methods of the present disclosure include adding a test sample to a solution in which an ES/μ-ES is submerged and connected to the electrochemical sensor. In some aspects, the ES/μ-ES is pre-calibrated to determine the particular electrochemical profile of a desired analyte. In some aspects, the electrochemical sensor is adjusted to the particular operating parameters of voltage, amperes, and resistance ranges, as well as reading forms, such as CV, SWV, and SWASV that are suitable for registering the presence of the target analyte or the interaction between the target analyte and the open ends of the CE and/or WE. In some aspects, a known volume of a target sample is added to the solution, wherein the ES/μ-ES generates a change in electrochemical signal in the presence of the target analyte. In some aspects, the target analyte is an ion, such as a cation or anion. In some aspects, the target analyte is a sugar or carbohydrate. In some aspects, the target analyte is a neurotransmitter. In some aspects, the target analyte is a metal. In some aspects, the target analyte is a therapeutic/pharmaceutical agent or metabolite thereof. It will be appreciated that the target analyte does not need to fall within any particular class of compound, but instead can be of any class of molecule that possesses the potential to interact with the open distal end of the HD-CNTfs of the ES/μ-ES. For example, as set forth in the working examples herein, the ES/μ-ES can be arranged to detect the presence of dopamine, glucose, lead, furosemide, and NADH.

A first aspect of the present disclosure, either alone or in combination with any other aspect, concerns a micro electrode set (μ-ES) comprising a working electrode (WE), a counter electrode (CE), and a reference electrode (RE), wherein the WE, CE, and RE each comprise a carbon nanotube fiber (CNTf) of a cylindrical length and an open circular distal end with an insulating substrate covering at least a portion of the cylindrical length up to the open distal end such that a solution in contact with the CE does not substantially contact the cylindrical length of the CNTf.

A second aspect of the present disclosure, either alone or in combination with any other aspect, concerns the μ-ES of the first aspect, wherein the RE further comprises a coating layer on the open circular distal end of the CNTf.

A third aspect of the present disclosure, either alone or in combination with any other aspect, concerns the μ-ES of the second aspect, wherein the coating layer comprises silver and silver chloride.

A fourth aspect of the present disclosure, either alone or in combination with any other aspect, concerns the μ-ES of the third aspect, wherein the coating layer further comprises sodium tetrafluoroethylene or similar ionophore.

A fifth aspect of the present disclosure, either alone or in combination with any other aspect, concerns the μ-ES of the first aspect, wherein the CNTfs of the WE, CE, and RE are highly densified CNTFs (HD-CNTfs).

A sixth aspect of the present disclosure, either alone or in combination with any other aspect, concerns the μ-ES of the first aspect, wherein the insulating substrate comprises an epoxy.

A seventh aspect of the present disclosure, either alone or in combination with any other aspect, concerns the μ-ES of the sixth aspect, wherein the CNTfs of the WE, CE and RE are embedded within the epoxy.

An eighth aspect of the present disclosure, either alone or in combination with any other aspect, concerns the μ-ES of the seventh aspect, wherein the epoxy is cured or dried.

A ninth aspect of the present disclosure, either alone or in combination with any other aspect, concerns the μ-ES of the first aspect, wherein a proximal end of each of the CNTfs of the WE, CE, and RE is operably connected to an electrochemical sensor.

A tenth aspect of the present disclosure, either alone or in combination with any other aspect, concerns the μ-ES of the ninth aspect, wherein the proximal end is connected to the electrochemical sensor through a silver paste.

An eleventh aspect of the present disclosure, either alone or in combination with any other aspect, concerns the μ-ES of the first aspect, wherein the distal end of the WE further comprises a copper layer.

A twelfth aspect of the present disclosure, either alone or in combination with any other aspect, concerns the μ-ES of the eleventh aspect, wherein the copper layer comprises copper nanoparticles (NPs).

A thirteenth aspect of the present disclosure, either alone or in combination with any other aspect, concerns the μ-ES of the first aspect, wherein the CNTf of the WE has a diameter of between 30 μm and 50 μm.

A fourteenth aspect of the present disclosure, either alone or in combination with any other aspect, concerns the μ-ES of the first aspect, wherein the CNTf of the CE has a diameter of between 80 μm and 100 μm.

A fifteenth aspect of the present disclosure, either alone or in combination with any other aspect, concerns the μ-ES of the first aspect, wherein the CNTf of the RE has a diameter of between 80 μm and 100 μm.

A sixteenth aspect of the present disclosure, either alone or in combination with any other aspect, concerns a method for detecting the presence of a target analyte in a test sample, comprising: submerging the μ-ES of the first aspect in a solution, wherein the proximal ends of the WE, CE and RE are connected to an electrochemical sensor; and, adding a volume of the test sample to the solution, wherein a change in the electrochemical sensor confirms the presence of the target analyte in the test sample.

A seventeenth aspect of the present disclosure, either alone or in combination with any other aspect, concerns the method of the sixteenth aspect, wherein the solution comprises one or more electrolytes in water.

An eighteenth aspect of the present disclosure, either alone or in combination with any other aspect, concerns the method of the sixteenth aspect, wherein the target analyte is selected from dopamine, lead, glucose, furosemide, and β-nicotinamide adenine dinucleotide (NADH).

A nineteenth aspect of the present disclosure, either alone or in combination with any other aspect, concerns the method of the sixteenth aspect, further comprising pre-calibrating the μ-ES to the target analyte.

A twentieth aspect of the present disclosure, either alone or in combination with any other aspect, concerns the method of the nineteenth aspect, wherein the μ-ES is pre-calibrated to determine the limiting current at the open distal end of the CNTfs of the WE.

EXAMPLES

These experiments were arranged to arrive at an ES/μ-ES design where all three electrodes, based on CNTs rods, are assembled on the same platform and directly connected to a metallic contact for electronic circuits at one side and exposed open ends on other side being used for sensitive and selective detection of testing analytes. Thus, the ES/μ-ES design allows for the application of the exceptional properties of pure CNTs in the electrochemical sensing of different important biomolecules and an environmentally toxic heavy metal in different electrolyte medium.

CNT materials employed in sensor development are required to have high purity, and must be free of catalyst and preferentially should preserve their pristine nature.

The CNT micro-electrode assembly starts with the synthesis of vertically aligned spinnable/drawable CNT arrays. Typically, about 400 μm in length CNTs synthesized with unique density allow their self-assembly into macroscopic fibers. The synthesis process uses thin films of Fe and Co catalyst sputtered on 4-inch Si wafers having already a 5 nm $Al_2O_3$ as a buffer layer. The Si wafer substrates are scribed and broken into chips with dimensions 2 inch length and variable width (up to 1.5 inch) that are loaded into a modified commercial CVD (chemical vapor deposition) reactor ET3000 from CVD Equipment Corporation.

The CNT growth process takes place at 740 Torr pressure and 750° C. The main benefit of drawable CNT arrays is that it allows the assembly of catalyst-free and aligned CNTs into fibers, threads, films and sheets. Typically, CNT ribbon drawing starts at one edge of the CNT array and continues until the CNT array is consumed at the opposite edge. A combination of rotation and translation applied on the CNT ribbon allow the fabrication of CNT threads/fibers with cylindrical geometries. During this process no other chemical or binder is required to assemble individual CNTs into films and fibers. Approximately each linear millimeter of CNT array allows drawing a meter-long ribbon. More details about CVD grown CNT arrays of different width that were used to prepare different diameter CNT fibers using dry spinning process has been described in prior publications (see., e.g., Alvarez, et al., Carbon N. Y. 2015, 86, 350-357. doi.org/10.1016/j.carbon.2015.01.058; Alvarez, et al., Carbon N. Y. 2019, 144, 55-62. doi.org/10.1016/j.carbon.2018.11.036).

The CNT fiber (CNTf) consists of millions of CNTs which are held together by Van der Waals attraction forces. To increase the packing and alignment among the CNTs, fiber was soaked in acetone solvent for 96 h at 30° C. The soaking process makes the CNT fiber highly densified (HD) along with improved alignment of individual CNTs within the fiber. The densified fiber has also been found to show high conductivity and mechanical strength. The HD-CNTf rods ES/μ-ES microelectrodes were fabricated using one ~40 μm and two ~94 μm diameter CNT fibers of 1.5 cm length which were placed in parallel, with a distance of 2 mm, on tape. The HD-CNTf attached tape were then dipped vertically in Embed-812 monomer mixtures in a capsule shaped 2 mL plastic vial and cured at 80-90° C. in oven for 24 hours. The cured fiber embedded polymer capsule was then microtomed vertical to embedded CNT fiber into 40 μm thick slices with exposed open ends of 40 μm long HD-CNTf rods at both sides of the sliced film.

Figure 1B:
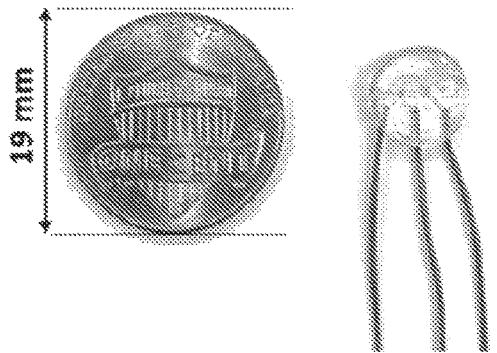
FIG. 1B shows an optical image of developed HD-CNTf ES/μ-ES sensor for size assessment compare with one cent coin USA.
Figures 2A, 2B, 2C, 2D:
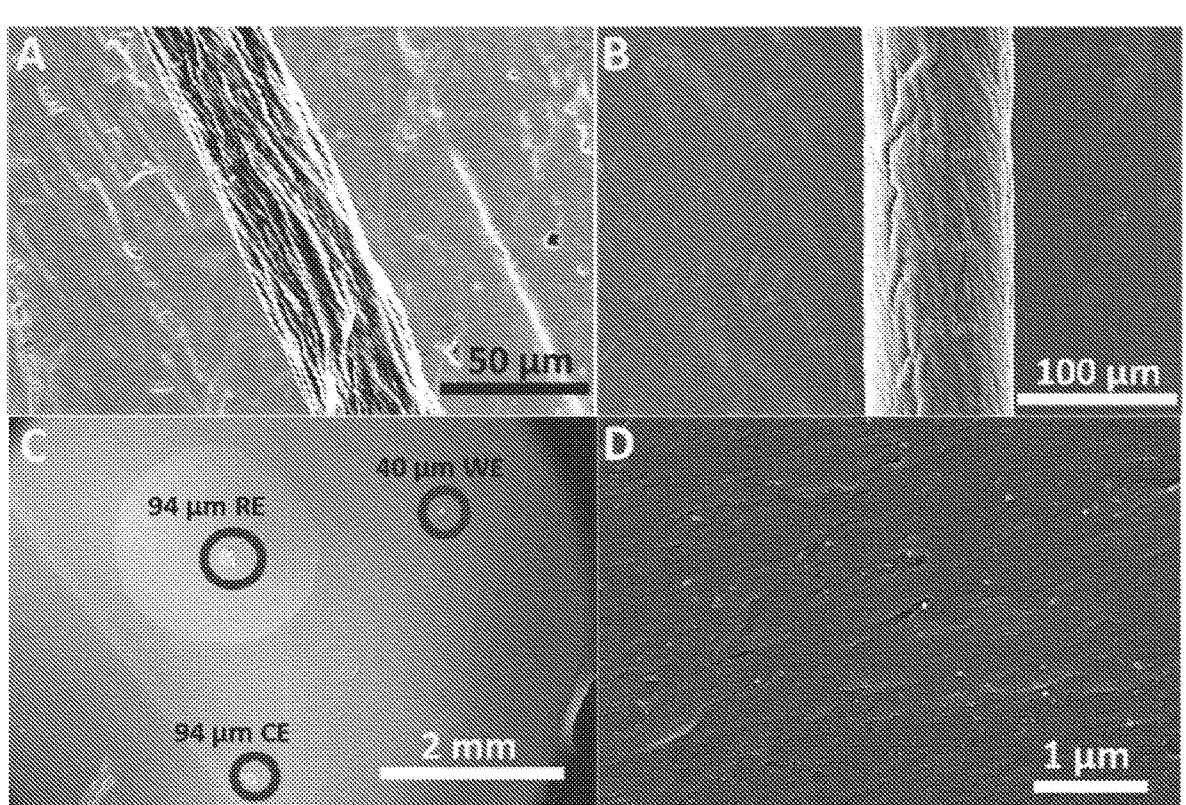
FIG. 2A shows HD-CNTf at 50 μm.
FIG. 2B shows HD-CNTf at 100 μm HD-CNTf.
FIG. 2C shows polymer embedded three cross section of HD-CNTf rods in marked circles used as working, quasi-reference and counter electrodes.
FIG. 2D shows a high magnification image of HD-CNTf rod cross section.

The HD-CNTf rods at the reverse side of the film were connected separately to conductive metal wires using silver paste and encapsulated with epoxy resin for electrical insulation while the exposed open ends of three HD-CNTf rods on the front side of the film were used as the working electrode (~40 μm diameter), reference and counter electrode (~94 μm diameter) for the electrochemical determination of analyte. The sensitivity of the sensor relies on the open-end structure of the CNTs that is the unique nature of the CNTs assembled as rods. Bare HD-CNTf rod cross sections were used as working and counter electrodes while Ag/AgCl/Nafion™ plated HD-CNTf rod cross section was used as the reference electrode. The schematic of the HD-CNTf ES/μ-ES sensor fabrication has been summarized in FIG. 1A and for the size assessment; the fabricated ES/μ-ES has been compared with one-cent coin USA, FIG. 1B. The different diameter densified CNTs fibers fabricated through dry spinning process have been shown in FIGS. 2A and 2B. Together the three fibers were encapsulated in an insulating polymer resin and microtomed orthogonal to the axis into ~40 µm long rods with open ended CNTs at both ends of the ES/µ-ES disk and RE electroplated with AgNPs (FIG. 2C). The higher magnification image of HD-CNTf rod working electrode surface (FIG. 2D), confirming the high density packing of CNTs within the fiber.

Figure 4:
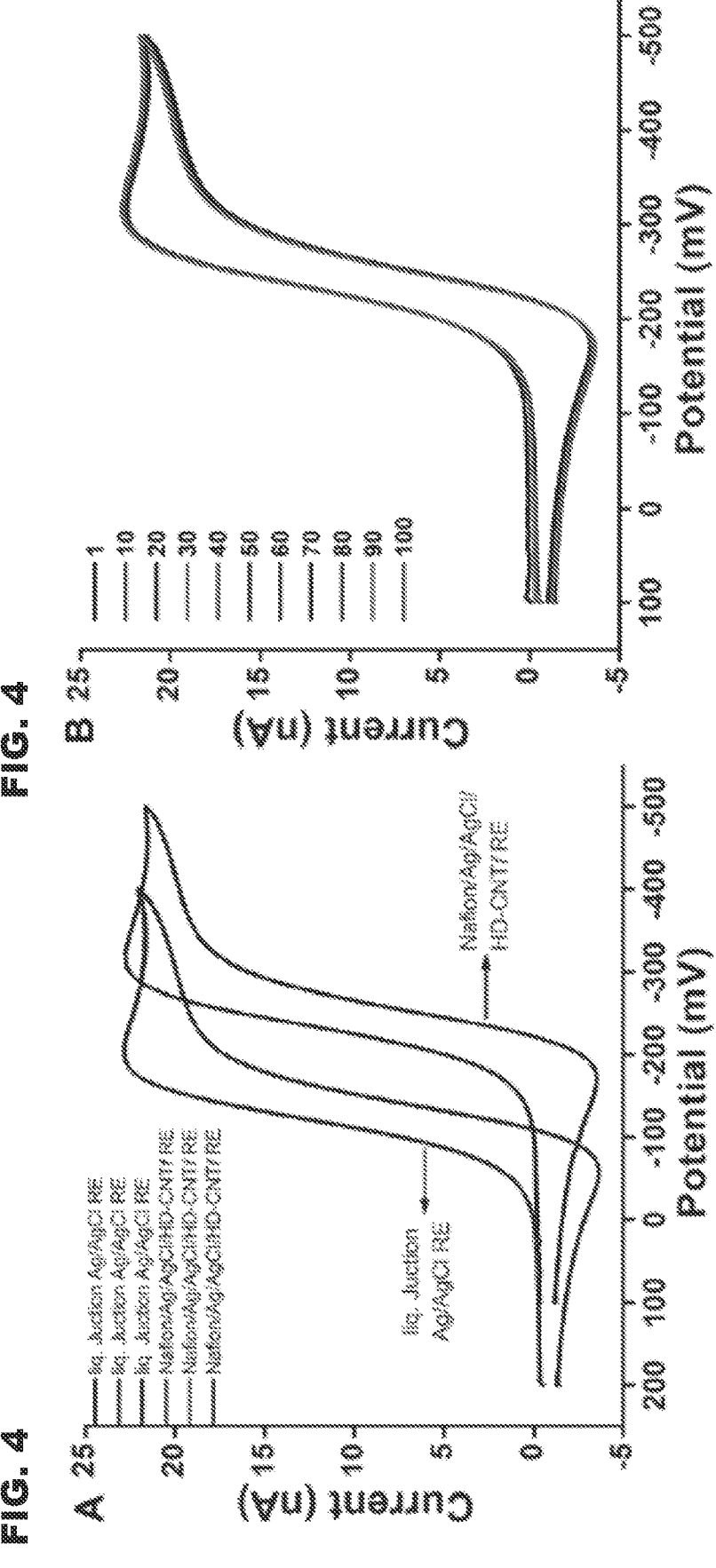
FIG. 4A shows a comparative evaluation of Ag/AgCl/Nafion™ coated HD-CNTf rod quasi-reference electrode on the right and liquid-junction Ag/AgCl commercial reference electrode on the left with HD-CNTf rods cross sections as working and counter electrodes.
FIG. 4B shows a HD-CNTf ES/μ-ES sensor recorded for 1 to 100 cycles at 100 mV/s.

One of the 100 µm diameter HD-CNTf rod cross-section was electroplated with Ag and then anodized in chloride solution to form a layer of AgCl and further followed by Nafion™ coating (FIGS. 3A, 3B, 3C and 3D). The Ag/AgCl/Nafion™ coated HD-CNTf rod electrode was evaluated as a quasi-reference electrode compared to the standard liquid-junction Ag/AgCl commercial reference electrode in redox analyte, i.e., 5 mM Ru(NH$_3$)$_6$] in 50 mM KCl with HD-CNTf rods embedded in polymer matrix as working (~40 µm diameter) and counter electrode (~94 µm diameter). The redox potential of the voltammogram recorded at the HD-CNTf ES/µ-ES sensor shifted negatively by around 150 mV due to difference in chloride ion concentration on Ag/AgCl NPs and commercial 3M KCl dipped Ag/AgCl wire as shown in FIG. 4A. Further, 100 CVs were continuously recorded at HD-CNTf ES/µ-ES sensor to examine the stable behavior as shown in FIG. 4B. The observed data showed constant peak potential and current as all recorded voltammograms overlapped each other confirming that, in the presented ES/µ-ES sensor, Ag/AgCl/Nafion™ coated HD-CNTf rod as quasi-reference electrode and bare HD-CNTf rods cross section as working and counter electrode are stable and suitable for multiple electroanalytical applications.

The performance of the ES/µ-ES was quantitatively characterized by different voltammetric techniques i.e. cyclic voltammetry (CV), square wave voltammetry (SWV), amperometry, and square wave anodic stripping voltammetry (SWASV) for the sensitive detection of important biomolecules (dopamine (DA), β-Nicotinamide adenine dinucleotide (NADH)), diuretic drug (furosemide) in phosphate buffer solution and heavy metal (e.g. lead (Pb$^{2+}$)) in tap water. The HD-CNTf ES/µ-ES sensor showed excellent sensitivity toward biomolecules and heavy metal detection.

The calibration study of DA was performed at the HD-CNTf ES/µ-ES in 0.1 M phosphate buffer of pH 7.2. The observed voltammograms show that the dopamine oxidation peak current increases linearly with the concentration over the entire range from 1 nM to 50 µM as shown in FIG. 4A and can be expressed by the following linear equation:

$$i_p(nA)=0.0955[C_{dopamine}(0.001-50\mu M)]+0.1216 \quad (R2=0.993)$$

where i$_p$ is the peak current in nA and C is the concentration of DA in µM. The limit of detection (LOD) was calculated by using 3σ/b, where a is the standard deviation of the blank solution, and b is the slope of the calibration plot and was found to be 0.5 nM. The HD-CNTf ES/µ-ES sensor was also tested for selective determination of DA in presence of potential interference analytes i.e. ascorbic acid (AA) and uric acid (UA) in FIG. 4B. The SWVs in a mixture of 5 µM DA were recorded with increasing concentration of AA and UA up to 500 µM as shown in FIG. 4B. The observed results clearly demonstrate the selective detection of DA where the electrochemical oxidation of DA was not affected in presence of 100 times higher concentrations of AA and UA. In the observed voltammograms, DA and UA showed significant peaks while AA oxidation was completely diminished at HD-CNTf cross section surface which can be explained by the electrostatic barrier at CNT cross section surface.

Figure 5:
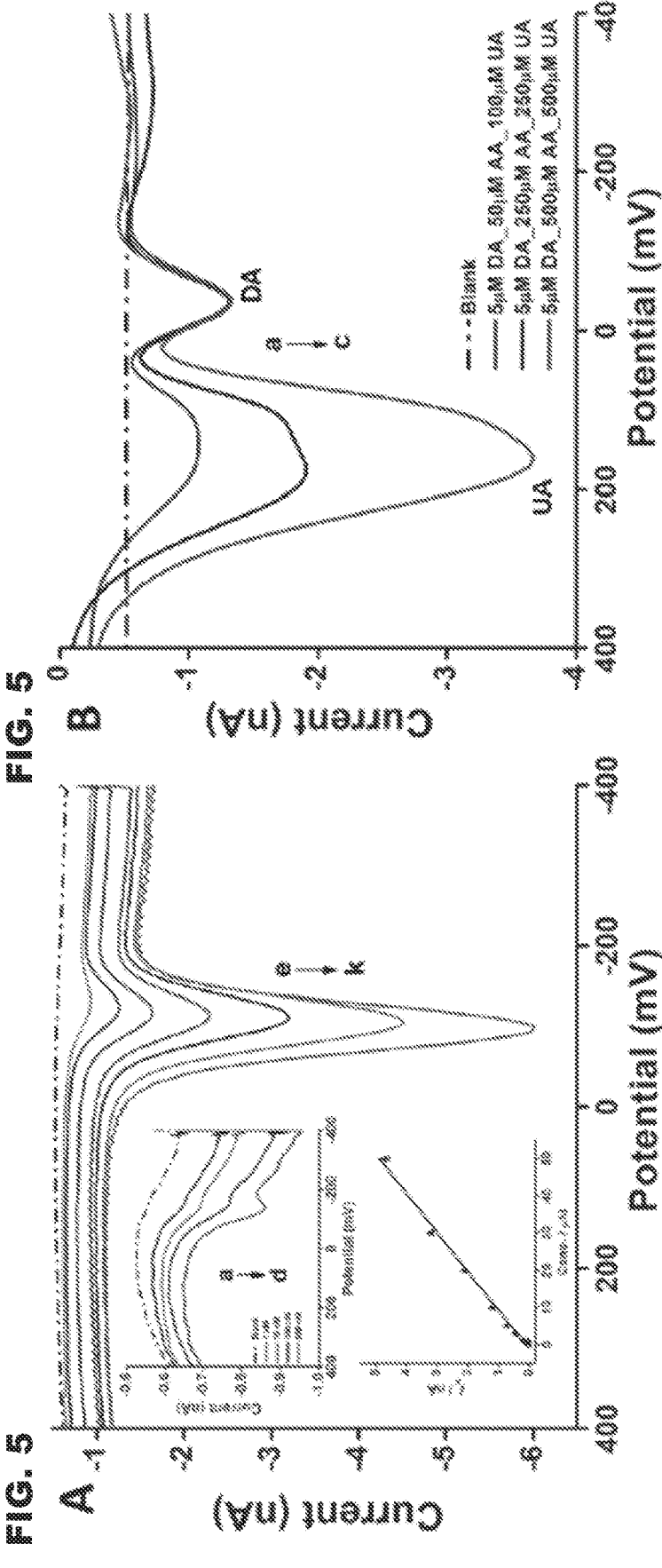
FIG. 5A shows SWVs recorded for increasing concentration of DA at (a) 0.001, (b) 0.01, (c) 0.1, (d) 0.5, (e) 1, (f) 3, (g) 5, (h) 10, (i) 20, (j) 30 and (k) 50 μM in pH 7.2 phosphate buffer using HD-CNTf ES/μ-ES sensor. The upper inset graph is the SWVs of lower concentration dopamine and lower inset graph is the observed calibration plot between [C] and ip.
FIG. 5B shows SWVs showing interference of AA (a) 50 μM, (b) 250 μM, (c) 500 μM and UA (a) 50 μM, ((b) 250 μM, (c) 500 μM at fixed 5 μM concentration of DA. Blank is shown by dotted line.

Over 300 dehydrogenases are known which are dependent on the coenzyme, NADH and its oxidized form NAD+. The electrochemical oxidation of NADH is of great interest due to its significance in a whole diversity of dehydrogenase based biosensors. The cyclic voltammogram of 5 mM NADH was recorded in 0.1 M phosphate buffer of pH 7.2 at 100 mV/s scan rate as shown in FIG. 5A. The oxidation of NADH at the HD-CNTf ES/µ-ES sensor occurs at ~250 mV and in reverse scan no peak for NADH is observed shows irreversible oxidation behavior of NADH. Further, SWV was used to investigate the ES/µ-ES sensor properties during NADH oxidation under optimum conditions. FIG. 5B displays SW voltammograms of NADH with different concentrations and the oxidation peak current was found to increase as the concentration of NADH increased and a linear relationship with NADH concentration was observed in a wide range of 1 µM to 1000 µM (FIG. 5B inset). The linear relationship of NADH concentration versus peak current can be expressed by the following equation:

$$i_p(nA)=0.003[C_{NADH}(1-1000\mu M]+0.066(R2=0.990)$$

where i$_p$ is the peak current in nA and C is the concentration of NADH in µM. The LOD was calculated using 3σ/b and found to be 16 nM. The observed wide linear range can be useful in developing further applications based on dehydrogenase. FIG. 5C displays the current-time response from additions of NADH to a 0.1 M phosphate buffer of pH 7.2 solution under conditions where the potential was kept at +300 mV. FIG. 5C presents the amperometric response of the HD-CNTf ES/µ-ES sensor at +300 mV to the successive addition of NADH into a stirred buffer solution. It was observed that the HD-CNTf ES/µ-ES sensor responds very rapidly, as the immediately after the addition of NADH, the anodic current increased and produced a steady state within 5-6 s. From the observed data, the ES/µ-ES sensor was found to exhibit a linear range up to 250 µM concentration of NADH with a correlation coefficient of 0.980 and a slope of 6 pA µM−1.

Figure 7:
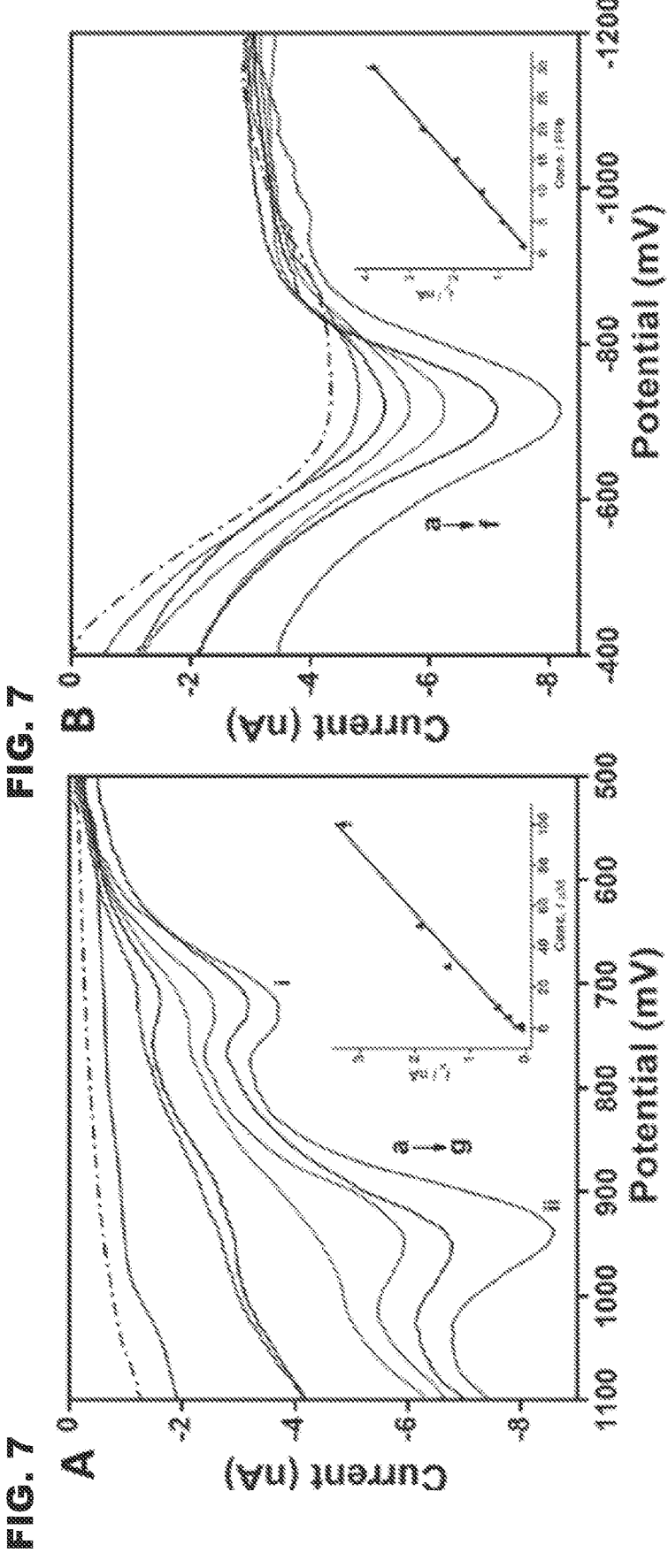
FIG. 7A shows SWVs for various concentrations of furosemide, (a) 0.1, (b) 1, (c) 5, (d) 10, (e) 30, (f) 50 and (g) 100 μM on the HD-CNTf ES/μ-ES sensor in 0.1 M phosphate buffer of pH 2.2.
FIG. 7B shows SWASVs for $Pb^{2+}$ in tap water at the HD-CNTf ES/μ-ES sensor: (a) 1, (b) 5, (c) 10, (d) 15, (e) 20, and (f) 30 ppb of $Pb^{2+}$. Accumulation time: 120 s; deposition potential: −1.2 V. Observed calibration plots between [C] and ip (inset). Blank shown by dotted line.

Furosemide, a diuretic drug that increases the urine flow and sodium excretion used in the treatment of several diseases and syndromes. Like other diuretic drugs, furosemide is abused by athletes for rapid weight loss and also used to mask the presence of other doping agents by reducing their concentration in the urine, therefore diuretics are listed in the list of prohibited substances by the World Anti-Doping Agency (WADA).58 The SWVs recorded with increasing concentration of furosemide showed the linear increment in both oxidation currents i.e. peak (i) at ~720 mV and peak (ii) at ~940 mV as shown in FIG. 7A. The second peak (ii) is relatively more intense and showed larger increment with increase in concentration than peak (i). Therefore, the peak currents of peak (ii) were used for evaluation. The proposed HD-CNTf ES/µ-ES sensor shows two clear oxidation peaks for 100 nM concentration of furosemide, which is well below the minimum required performance level (MRPL) of diuretics set by WADA. Concentration investigations were carried out in the range of 100 nM to 100 µM, and peak current (peak ii) dependence on concentration can be expressed as:

$$i_p(nA)=0.032[C_{furosemide}(0.1-100\mu M]+ 0.1681R2=0.986$$

where i$_p$ is the peak current in nA and C is the concentration of furosemide in µM. The LOD using 3σ/b, was observed to be 2 nM.

Lead contamination in drinking water is a major global issue. In USA, lead service pipelines and lead-containing plumbing materials are the largest contributors of lead contamination in U.S. houses drinking water supply. The sensitive detection of $Pb^{2+}$ was performed using SWASV in tap water without adding any supporting electrolyte and reagent. The tap water sample was collected from a faucet in Crosley Tower, University of Cincinnati having pH value and conductivity as 8.3 and 285 μS/cm, respectively. The applied deposition potential −1200 mV is sufficiently negative to reduce $Pb^{2+}$ along with other heavy metal ions if present in tap water and optimized 120 s deposition time was selected to balance calibration range along with lower detection limit. The well-defined stripping peaks were obtained for lead ions over the concentration range 1-30 ppb as shown in FIG. 7B. The stripping peak current was found to increase linearly versus metal ion concentration and the correlation equation can be expressed as:

$$i_p(nA)=0.118[C_{pb2+}(1-30ppb)]+0.2808R2=0.996$$

where $i_p$ is the stripping peak current (nA) and C is the concentration of $Pb^{2+}$ metal ions in ppb (parts per billion) in tap water. The LOD was calculated to be 400 ppt for $Pb^{2+}$ in tap water. The proposed HD-CNTf ES/μ-ES sensor successfully quantified 1 ppb concentration of lead ions in tap water without adding any supporting electrolyte, which is well below the allowable limits of the World Health Organization (WHO; 10 ppb) and United States-Environment Protection Agency (US-EPA; 15 ppb), showing the high sensitivity and robustness of the ES/μ-ES sensor for onsite application of heavy metal detection.

Copper μ-ES

For the fabrication of CNT rods embedded polymer films, the EMBed-812 embedding kit consisting of monomers and cross linkers was purchased from Electron Microscopy Sciences (PA, USA) and prepared according to given instructions. CNT fiber was densified in acetone solvent for 96 h at 30° C. in an oven. CNT fiber was produced from CVD grown vertically aligned CNT forests where ethylene (Wright Brothers, USA) was used as the carbon source and Fe/Co as the catalyst (Goodfellow, USA) (see, e.g., Alvarez, et al., Carbon 144 (2019) 55-62, doi.org/10.1016/j.carbon.2018.11.036; Alvarez et al., Carbon 86 (2015) 350-357, doi.org/10.1016/j.carbon.2015.01.058). All other chemicals and solvents used in the study were of analytical grade, and Milli-Q ultrapure deionized water (18 MΩ cm) was used to prepare all the solutions.

Cyclic voltammetry was performed with a computerized Bio-analytical system Epsilon EClipse™ and amperometry experiments were recorded using CHI 760E electrochemical workstation from CH instruments. The μ-ES consists of three HD-CNTf rods of different diameter where ~40 μm diameter coated with CuNPs was used as the working electrode (WE), ~94 μm diameter HD-CNTf rod coated with Ag/AgCl/Nafion™ used as quasi-reference electrode (QRE) and ~94 μm diameter bare HD-CNTf rod was used as counter electrode (CE). For comparison of QRE, an Ag/AgCl (3 M NaCl) (ALS Co., Ltd, Model 012167 RE-1B) was used as a standard reference electrode. Gamry Reference 600 potentiostat was used to record electrochemical impedance spectroscopy (EIS) data. Surface characterization of CuNPs/μ-ES were performed using field emission-scanning electron microscopy (FE-SEM) FEI XL30 operated at 10 kV acceleration voltage and Raman spectra were collected using a Renishaw inVia Raman microscope, excited by a 633 nm Ar-ion laser, Gloucestershire UK. Raman spectra are collected at 5 points for each sample using ~10 s acquisition time with 10% power. The time and power are kept constant during Raman studies.

CNT fibers with different diameters were produced from vertically aligned CNT forest arrays synthesized by CVD. The vertically aligned CNT forest array was drawn from one end and twisted into a fiber using a spinning and pulling motor simultaneously. The produced fiber was held together by van der Waals attraction and the packing density of CNTs within the fiber was poor. To increase the packing density, the fiber was soaked in acetone under optimized conditions (96 h at 30° C. in an oven). The densification process improved the alignment of the CNTs within the fiber and has also been shown to increase the conductivity of CNTf.

Briefly, one 40 μm and two 94 μm diameter HD-CNTf of 1.5 cm in length were placed parallel to each other, with a spacing of 2 mm, on a tape scaffold. The HD-CNTf attached to the scaffold was placed vertically in a 2 mL capsule-shaped plastic vial, which was then filled with an Embed-812 monomer mixture and cured at 90° C. in an oven for 24 h. The HD-CNTf-embedded cured polymer capsule was removed from the plastic vial and microtomed perpendicular to the embedded CNTf into 40 μm thick slices, which resulted in the open ends of 40 μm long HD-CNTf being exposed at both sides of the sliced film. The exposed open ends of each HD-CNTf (one 40 μm and two 94 μm in diameter) on one side (electrical contact side) of the sliced film were connected to a conductive metal wire using silver paste and then encapsulated with epoxy resin for electrical insulation. The other side of the film was used as a μ-ES with the ~40 μm diameter HD-CNTf as the WE and the ~94 μm diameter HD-CNTf as the reference electrode and CE. For glucose determination, the bare HD-CNTf cross-section was used as the CE, whereas the reference electrode was modified with Ag/AgCl and then coated with Nafion™ to produce a QRE. Furthermore, for the WE, the 40 μm HD-CNTf cross-section was modified with CuNPs.

The QRE was fabricated as described above, with first Ag nanoparticles (NPs) electroplating onto the cross section of one ~94 μm HD-CNTf rod using 30 mM $AgNO_3$ in 1 M $NH_3$ solution with electrochemical deposition carried out by applying an optimized reduction potential at −300 mV for 30 s in stirred $AgNO_3$ solution, and then rinsed with DI water and dried under ambient room temperature. To form a thin layer of AgCl, a drop of 50 mM $FeCl_3$ solution was cast onto the surface of AgNPs coated HD-CNTf cross section for 90 s and further rinsed with DI water and dried under ambient room temperature. The direct exposure of Ag/AgCl/HD-CNTf to electrolyte solution was found to alter the potential of QRE due to possible degradation of Ag/AgCl layer in long-term electrochemical calibration studies. Therefore, to avoid the alteration or degradation of the Ag/AgCl layer, a drop of 5% Nafion™ solution was casted onto the Ag/AgCl coated HD-CNTf rod surface. The Nafion™ coated surface was dried under ambient room temperature for 12 h and then cured in an oven at 90° C. for 1 h. The Nafion™ coating was found to provide a stable potential and maintains the integrity of the Ag/AgCl surface for extensive electrochemical testing for several days.

To modify the ~40 μm diameter HD-CNTf rod cross section with CuNPs, the controlled potential electrolysis (CPE) was performed in an optimized 1:0.5:0.5 solution mixture of 10 mM copper sulfate solution, 0.5 mM of boric acid and 0.5 mM of sulfuric acid, respectively. Initially to optimize the CuNPs deposition on HD-CNTf surface different constant potential i.e., −150 mV, −250 mV, −350 mV and −450 mV were applied for 180 s (optimized). After CuNPs deposition, electrodes were rinsed with DI water and dried under ambient room temperature. The electrode prepared at −350 mV showed highest peak current for glucose electrooxidation compared to the other fabricated electrodes, therefore, an optimized–350 mV potential was selected to study the glucose electrooxidation at CuNPs/HD-CNTf. The EDAX characterization of the CuNPs modified HD-CNTf cross section confirmed the electrochemical deposition of CuNPs on the open-ended or defective sites (sp³ carbon) of the CNTs.

The 0.1 M NaOH solution was used as supporting electrolyte in all electrochemical studies. The stock solutions of glucose were prepared in deionized (DI) water. The CV measurements were performed in the potential window of −200 mV to +500 mV for calibration and scan rate studies. Amperometric measurements were recorded at optimal +400 mV potential by consecutive addition of glucose concentrations at 40 s interval time, with the current response being stable, into the stirred 0.1 M NaOH solution. The CuNPs/μ-ES was applied in triplicate (n=3) for each electrochemical determination. Amperometric experiments were repeated at three electrodes for the calibration study and real samples assays. All experiments were carried out at room temperature. The EIS measurements of CuNPs/μ-ES were recorded in 5 mM K₃[Fe(CN)₆] and KCl (0.1 M) solution. An alternating potential with 10 mV amplitude was applied in the frequency range from 1 Hz to 106 Hz on microelectrode. All the potentials are reported with respect to the Ag/AgCl/Nafion™ electrode at an ambient temperature of 25±2° C., unless otherwise stated.

Figure 8:
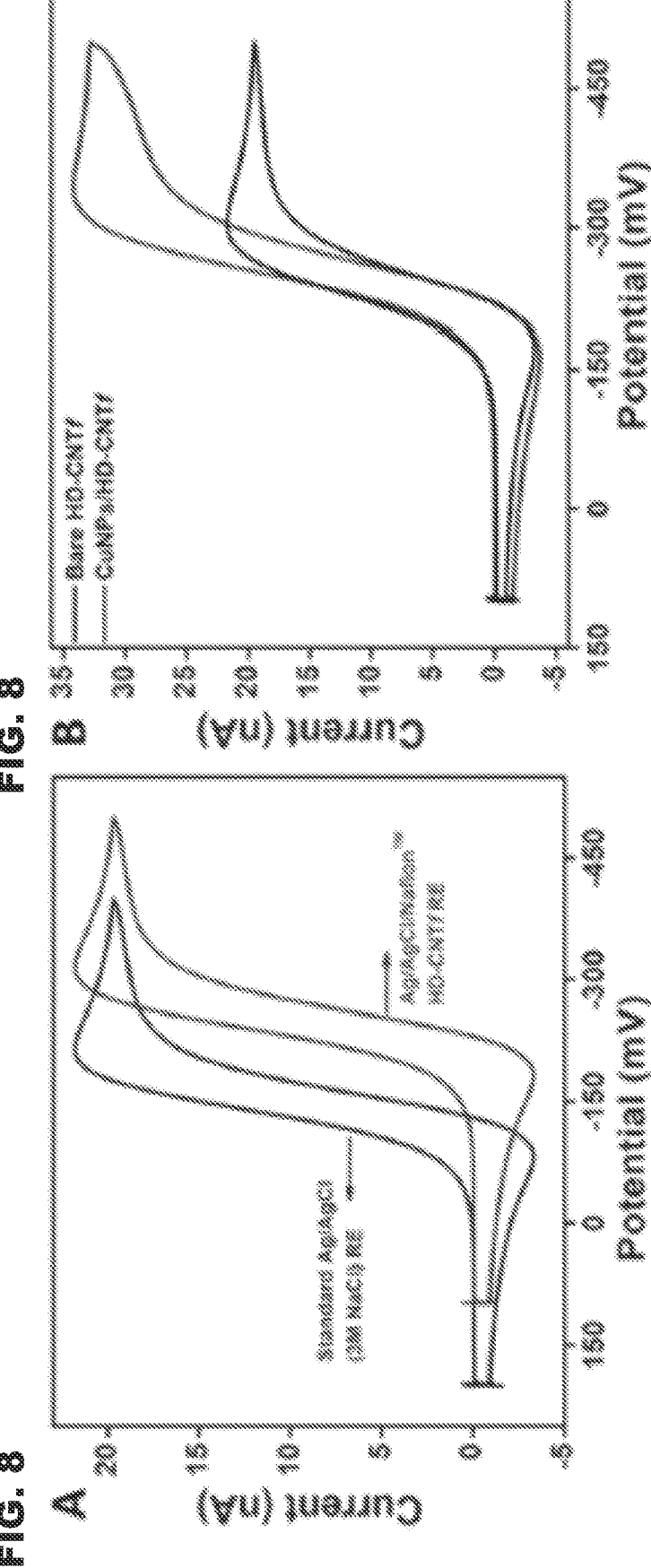
FIG. 8A shows CVs recorded in 5 mM $[Ru(NH_3)_6]^{3+}$ in 50 mM KCl for a comparative evaluation of the commercial Ag/AgCl reference electrode (3 M NaCl) and Ag/AgCl/Nafion™/HD-CNTf rod quasi-reference electrode using bare HD-CNTf rod cross sections as the working and counter electrodes.
FIG. 8B shows bare and CuNPs/HD-CNTf rod working electrode using Ag/AgCl/Nafion™/HD-CNTf rod quasi-reference electrode and bare HD-CNTf rod counter electrode. Scan rate of 100 $mVs^{-1}$.

In order to confirm the impact of CuNPs modification on the HD-CNTf rod, further CVs were recorded on bare and CuNPs modified working electrode (~40 μm diameter) in 5 mM [Ru(NH₃)₆]³⁺ and 50 mM KCl at a scan rate of 100 mV·s⁻¹ using μ-ES where Ag/AgCl//Nafion™/HD-CNTf rods were used as QRE (~94 μm diameter) and bare HD-CNTf rods used as counter electrode (~94 μm diameter). A comparison of CVs at bare and CuNPs modified HD-CNTf rods is shown in FIG. 8B. The reduction peak current of [Ru(NH₃)₆]³⁺ at CuNPs/HD-CNTf was found to increase by ~10.5 nA magnitude compared to the bare HD-CNTf which can be assigned to the increment in the surface area after CuNPs deposition at the cross section of HD-CNTf rod.

Figure 9:
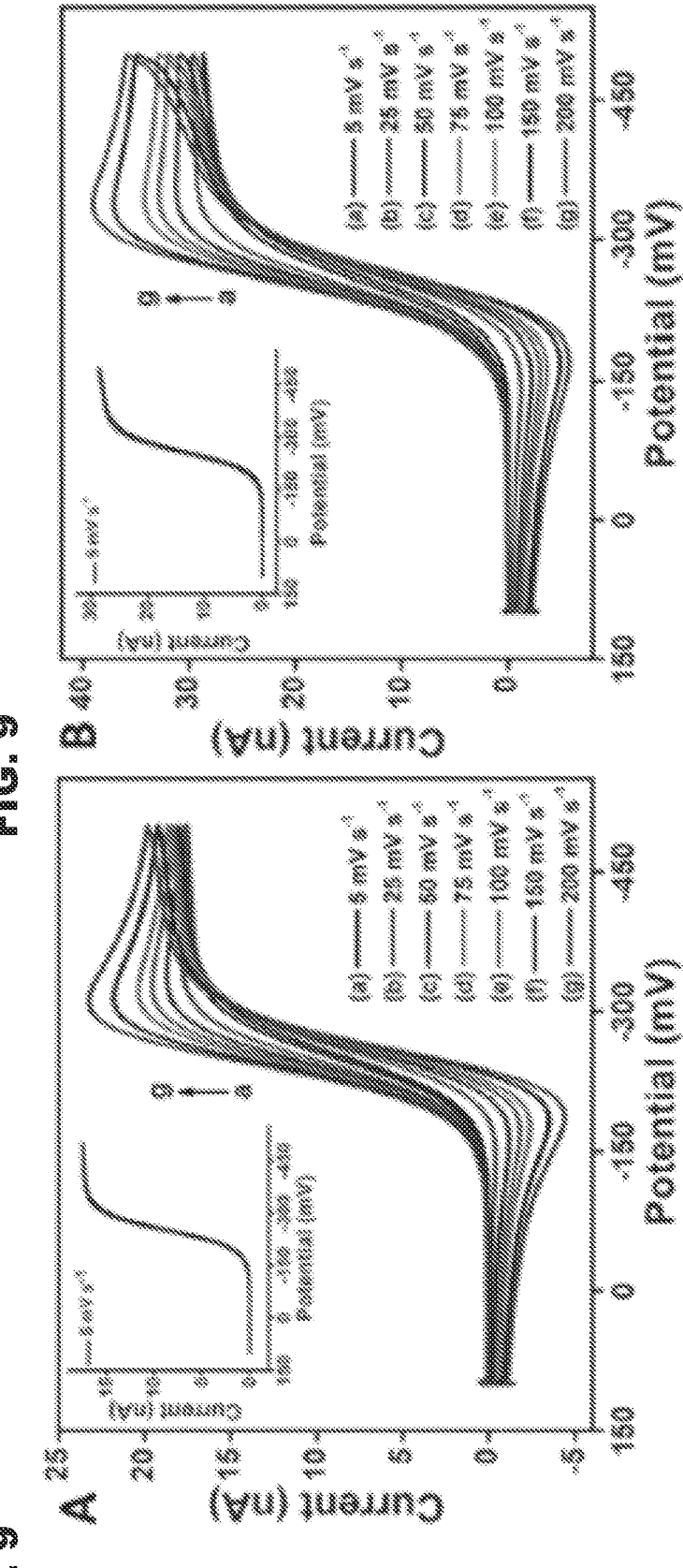
FIG. 9A shows cyclic voltammetry of 5 mM $[Ru(NH_3)_6]^{3+}$ in 50 mM KCl with increasing scan rates in a range of 5-200 mV/s with bare μ-ES.
FIG. 9B shows the same as 9A with CuNPs/μ-ES. Inset of both graphs show the CV recorded at a scan rate of 5 mV/s.

The effect of the scan rate (5-200 mV·s⁻¹) on the CV behavior of bare μ-ES and CuNPs/μ-ES in redox analyte 5 mM Ru(NH₃)₆³⁺ and 50 mM KCl (1:1 ratio) was also investigated. The observed voltammetric measurements for the reduction of [Ru(NH₃)₆³⁺/²⁺] showed sigmoidal steady state cyclic voltammograms with a magnitude of several nano-amperes at lower scan rate (5 mV·s⁻¹) (FIGS. 9A and 9B) that is the characteristic of hemispherical diffusion at microelectrodes. For a disk-shaped microelectrode, the steady state $i_{lim}$ value is given by the following Eq. (1):

$$i_{lim}=4nFDaC \tag{1}$$

where n refers to the number of electrons transferred per redox event, F is the Faraday constant 96,485 C mol⁻¹, diffusion coefficient (D) of 8.2×10⁻⁶ cm² s⁻¹, radius (a) for the cross-section of 20 μm and C is the concentration 2.5 mM for [Ru(NH₃)₆]Cl₃. From Eq. (1), the calculated limiting current is ~16 nA, which is the same magnitude observed for the reduction of redox analyte at bare HD-CNTf cross-section (inset; FIG. 9A). In case of CuNPs/HD-CNTf, the observed limiting current is ~28 nA (inset; FIG. 9B) which is near to double of the limiting current observed at bare HD-CNTf cross section. The increment in the limiting current can be assigned to the deposition of CuNPs at the cross section of HD-CNTf which significantly increases the active surface area of the working microelectrode. Further increment in the scan rates (25-200 mV·s⁻¹)

shows small gentle peaks rather than steady-state current for both the forward and reverse scans. At higher scan rates, the diffusion layer becomes smaller and mass transport is likely to have an increased contribution from planner diffusion. The CuNPs modified CNTf cross section (FIG. 9B) shows slightly higher capacitive background with hysteresis in the reverse scan but faradic current is also larger compared to bare CNTf cross section (FIG. 9A) which is due to increase in the surface area after CuNPs deposition. The observed hysteresis may be due to the adsorption of redox analyte decomposed product on CuNPs/HD-CNTf and its slight effect also can be seen in reverse scan where the oxidation peak cannot be defined as identical to the reduction peak, whereas bare CNTf cross section showed identical redox peak current for forward and reverse scan. The ΔEp values for bare and CuNPs modified HD-CNTf were calculated by using halfwave form as the observed redox response cannot be considered as transient. In such a condition, the half-peak potential is a convenient indicator to examine the charge transfer rates. The ΔEp, for both bare HD-CNTf rod and CuNPs/HD-CNTf rod, is comparable with a difference in the ¼-wave and ¾-wave potential, E¼-E¾, in the range 55-59 mV, indicating reversible electrochemical reaction process with fast electron transfer kinetics at bare open ends and CuNPs modified HD-CNTf cross section.

The NaOH concentration is one of the key factors which affect the sensitivity of glucose oxidation on non-enzymatic electrode surfaces which can be explained by the formation of hydroxyl radicals at high potentials. Therefore, the effect of the NaOH concentration in the range of 10-500 mM on the current response for 0.5 M glucose was examined by CV at a scan rate of 50 mV·s⁻¹. In the absence of NaOH, no current response for glucose oxidation was observed. With the increase of NaOH concentration until 0.5 M NaOH, the peak potential shifts more positive. The anodic peak current for glucose oxidation was increased with a maximum current at 0.1 M NaOH and then decreased slowly upon in-crease of the NaOH concentration. Therefore, 0.1 M NaOH was selected as the supporting electrolyte for electrochemical experiments of glucose detection.

Figure 10:
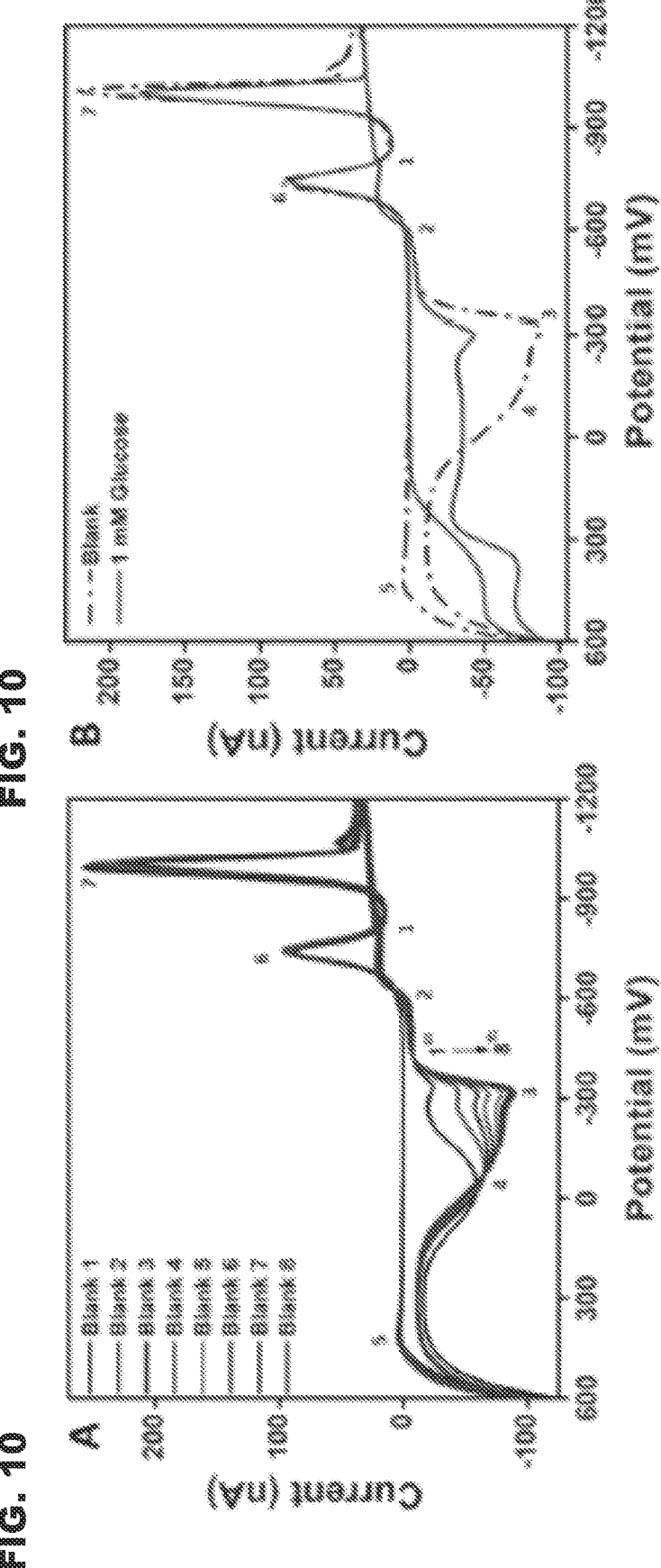
FIG. 10A shows consecutive cyclic voltammograms recorded on the CuNPs/HD-CNTf microsensor in 0.1 M NaOH solution.
FIG. 10B shows cyclic voltammograms recorded on the CuNPs/HD-CNTf microsensor in the absence (dotted line) and presence (solid line) of 1 mM glucose in 0.1 M NaOH. Scan rate of 50 $mVs^{-1}$.

Before implementing the CuNPs/HD-CNTf microsensor for glucose sensing, its electrochemical behavior was investigated in alkaline solution using CV. FIG. 10A shows successive cyclic voltammograms recorded on the CuNP-modified HD-CNTf microsensor in 0.1 M NaOH at a scan rate of 50 mV·s⁻¹. The current-potential curve became stable after six cycles (FIG. 10A) and seven peaks were observed, in good agreement with the electrochemical processes reported elsewhere. In the anodic wave, peak 1 was assigned to the adsorption of oxygen, whereas peak 2 was attributed to the transition of Cu(0)/Cu(I) (i.e., Cu₂O). Peak 3 was associated with the formation of Cu(II), which involves two transition processes (i.e., Cu(0)/Cu(II) and Cu(I)/Cu(II)). Peak 4 corresponded to the broad peaks observed in the first few scans that merged upon scanning and was due to the formation of soluble species (i.e., HCuO²⁻) through the redox reactions of copper-based solid (s) and hydroxide ions. Further anodic scanning above 250 mV (vs Ag/AgCl/Nafion™/HD-CNTf) led to the formation of Cu(III), which could only be detected at high hydroxide concentrations. In the anodic potential region, the oxidation peak of Cu(II)/Cu(III) was not clearly observed. The formation of Cu(III) could be overlapped by the oxidative tail of water-splitting, observed as an increase in the current at 350-600 mV. In the cathodic scan, one small (peak 5) and two large reduction peaks (peaks 6 and 7) were observed, which were assigned to the conversion of Cu(III)/Cu(II), Cu(II)/Cu(I), and Cu(I)/Cu(0), respectively.

FIG. 10B displays the cyclic voltammograms obtained for the CuNPs/HD-CNTf microsensor in the absence and presence of glucose in 0.1 M NaOH recorded at 50 mV·s$^{-1}$. Some notable differences were observed between the cyclic voltammograms obtained in the presence and absence of glucose. First, oxidation peak 2 for the formation of Cu(0)/Cu(I) was identical in the absence and presence of glucose, which indicates that there was no interaction between glucose and Cu(0). Second, peak 3, which corresponds to two transition processes (i.e., Cu(0)/Cu(II) and Cu(I)/Cu(II)) showed a sharp decrease in peak current in the presence of glucose, indicating a transition majorly from Cu(0) to Cu(II) due to the formation of a Cu(I)-glucose complex. Third, the absence of peak 4 in the presence of glucose resulted from the absorption of glucose on the electrode catalytic sites, which prevented the further formation of soluble species by blocking the interactions between Cu-based solid(s) and hydroxide ions. Fourth, the dramatic increase in the anodic current signal at 230-500 mV in the presence of glucose indicated the desorption of glucose from Cu(I) and the instantaneous electrocatalytic oxidation of glucose, which likely involved Cu(III) and hydroxyl radicals. Another study suggested that this anodic signal could also be attributable to a shift in peak 4 for the conversion of Cu(I)/Cu(II). Fifth, in the cathodic scan, the absence of peak 5 in the presence of glucose provided evidence for the consumption of Cu(III) during the electrooxidation of glucose. Finally, tiny decreases in the currents of peaks 6 and 7, which correspond to the conversion of Cu(II)/Cu(I) and Cu(I)/Cu(0), respectively, were attributed to the formation of a Cu(I)—glucose complex during the anodic scan, which affects the formation of Cu(II).

Although an accurate mechanism for glucose electrooxidation on copper-based electrodes in alkaline media has not been firmly established, the most detailed and confirmed work has been reported by Marioli et al. (Electrochim. Acta 37 (1992) 1187-1197, doi.org/10.1016/0013-4686(92)$_{85055}$-P). According to this study, glucose oxidation is activated by the deprotonation of glucose and isomerization to its enediol form followed by the formation of an intermediate by complexation or chelation with the electrode surface and oxidation by Cu(I), Cu(II), and Cu(III). Among the oxidation states of copper hydroxides, the Cu(III) form plays a major role in glucose oxidation. The conversion of Cu(II)/Cu(III) occurs at 250-600 mV. Thus, the glucose oxidation current signal was observed in this potential range because this reaction was strongly catalyzed by Cu(III) species, which acted as the main electron transfer mediator. This behavior was further confirmed by the absence of the Cu(III) reduction peak (peak 5, FIG. 10B) in the cathodic scan, as the Cu(III) species were consumed in the oxidation of glucose. The entire process for the electrooxidation of glucose on the CuNPs/HD-CNTf surface can be summarized as follows:

$$Cu + 2OH^- \longrightarrow Cu(OH)_2 + 2e^- \tag{2}$$

$$Cu(OH)_2 \rightleftharpoons CuO + H_2O \tag{3}$$

$$Cu(OH)_2 + OH^- \rightleftharpoons CuOOH + H_2O + e^- \text{ or} \tag{4}$$

-continued $$CuO + OH^- \longrightarrow CuOOH + e^- \tag{5}$$

$$CuOOH + Glucose + e^- \longrightarrow CuO + OH^- + Gluconolactone \tag{6}$$

$$Gluconolactone \xrightarrow{Hydrolysis} Gluconic\ acid \tag{7}$$

Figure 11:
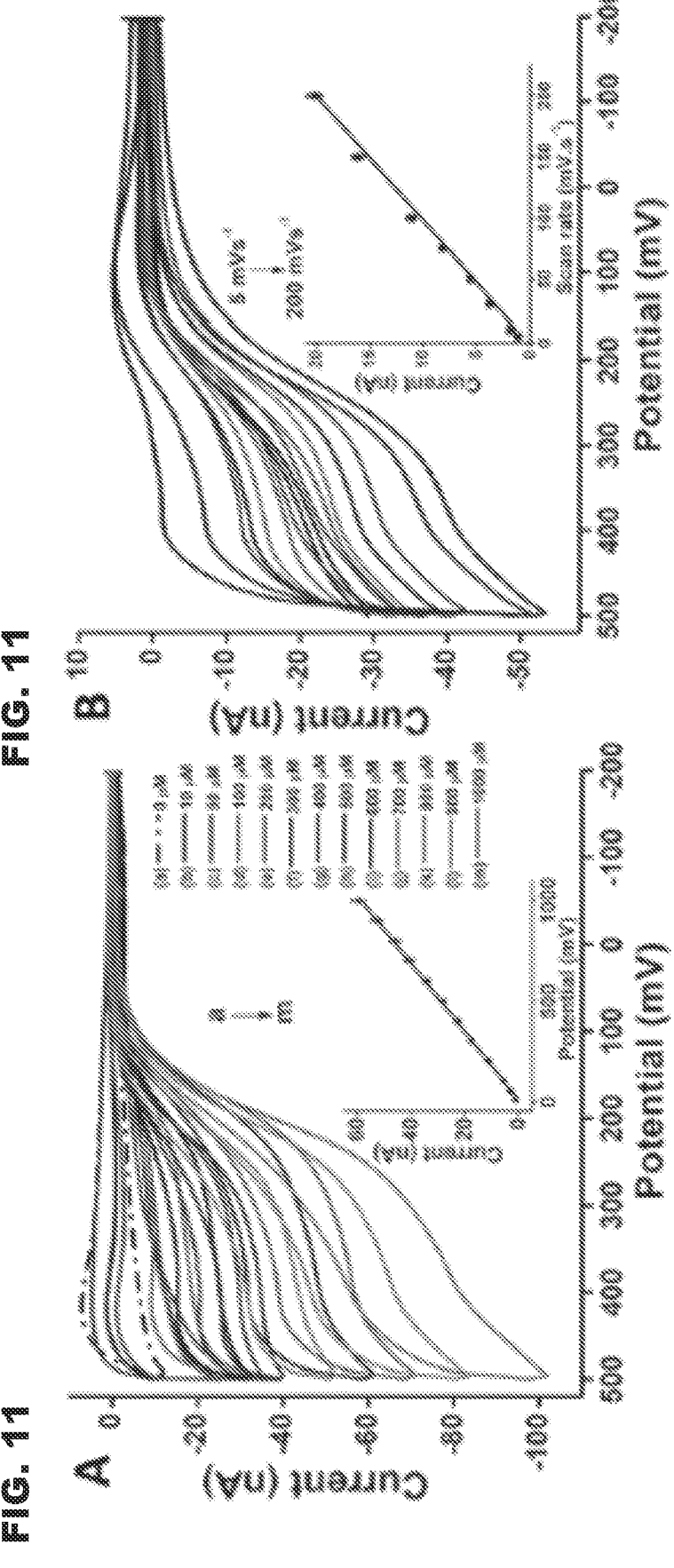
FIG. 11A shows cyclic voltammograms recorded on CuNPs/HD-CNTf microsensor in the presence of glucose at various concentrations: (a) 0, (b) 10, (c) 50, (d) 100, (e) 200, (f) 300, (g) 400, (h) 500, (i) 600, (j) 700, (k) 800, (l) 900, and (m) 100011M in 0.1 M NaOH at a scan rate of 50 $mVs^{-1}$.
FIG. 11B shows cyclic voltammograms for 0.5 mM glucose recorded on the CuNPs/HD-CNTf microsensor in 0.1 M NaOH at scan rates of 5-200 $mVs^{-1}$.

To investigate the applicability of the proposed CuNPs/HD-CNTf microsensor for nonenzymatic glucose sensing, CV measurements were performed at various glucose concentrations in 0.1 M NaOH at a scan rate of 50 mV·s$^{-1}$. In this experiment, a potential range of −200 to +500 mV (vs Ag/AgCl/Nafion™/HD-CNTf) was used, which is suitable or the amperometric study of glucose. As shown in FIG. 11A, the oxidation peak current increased linearly as the glucose concentration increased from 10 µM to 1 mM. No anodic current was observed in the absence of glucose, as shown by the dotted line. The linear relationship between the peak current and glucose concentration can be expressed by the following equation $$i_p(nA)=0.0586[C_{glucose}(10-1000\mu M)]-0.3023 \quad (R2=0.998) \tag{8}$$

where $i_p$ is the peak current and $C_{glucose}$ is the concentration of glucose. The wide linear range observed in the CV experiment indicates that CuNPs/HD-CNTf microsensor has excellent electrocatalytic activity to-ward the direct oxidation of glucose.

To elucidate the nature of the electron transfer kinetics, the electrooxidation of 0.5 mM glucose in 0.1 M NaOH was investigated at different scan rates (5-200 mV·s$^{-1}$). As shown in FIG. 11B, the anodic peak current for the oxidation of glucose increased linearly with the increasing scan rate. Linear relationships were observed for both $i_p$ vs scan rate (v) and log $i_p$ vs log v, as represented by Eqs. (9) and (10), respectively:

$$i_p(nA)=(0.0994\pm0.0012)(v(mV\cdot s^{-1}))+(0.7795\pm0.1370) \quad R2=0.998 \tag{9}$$

$$\log i_p(nA)=(0.7896\pm0.0266)(\log v(mV\cdot s^{-1}))- (0.5438\pm0.0462)R2=0.993 \tag{10}$$

The linearity of the $i_p$ vs v plot (inset, FIG. 11B) and the slope value of ~0.789 (>0.5) for the log $i_p$ vs log v plot indicate that the oxidation of glucose on CuNPs/HD-CNTf was a surface-controlled process.

Further, the electrooxidation of glucose was studied in a phosphate buffer solution of pH 7.4. The glucose oxidation did not show significant electrocatalytic activity on the surface of CuNPs/HD-CNTf in the phosphate buffer solution as compared to the NaOH solution.

The applied potential had a significant influence on the sensitivity, selectivity, and stability of the amperometric current of the developed sensor, therefore experiments were performed to first optimize the applied potential for glucose oxidation on CuNPs/HD-CNTf. For potential optimization, the amperometric experiments were performed at various potentials ranging from +250 mV to +450 mV (vs. Ag/AgCl/Nafion™/HD-CNTf) with the stepwise addition of 20 µM glucose in 0.1 M NaOH solution under stirring.

Figure 12:
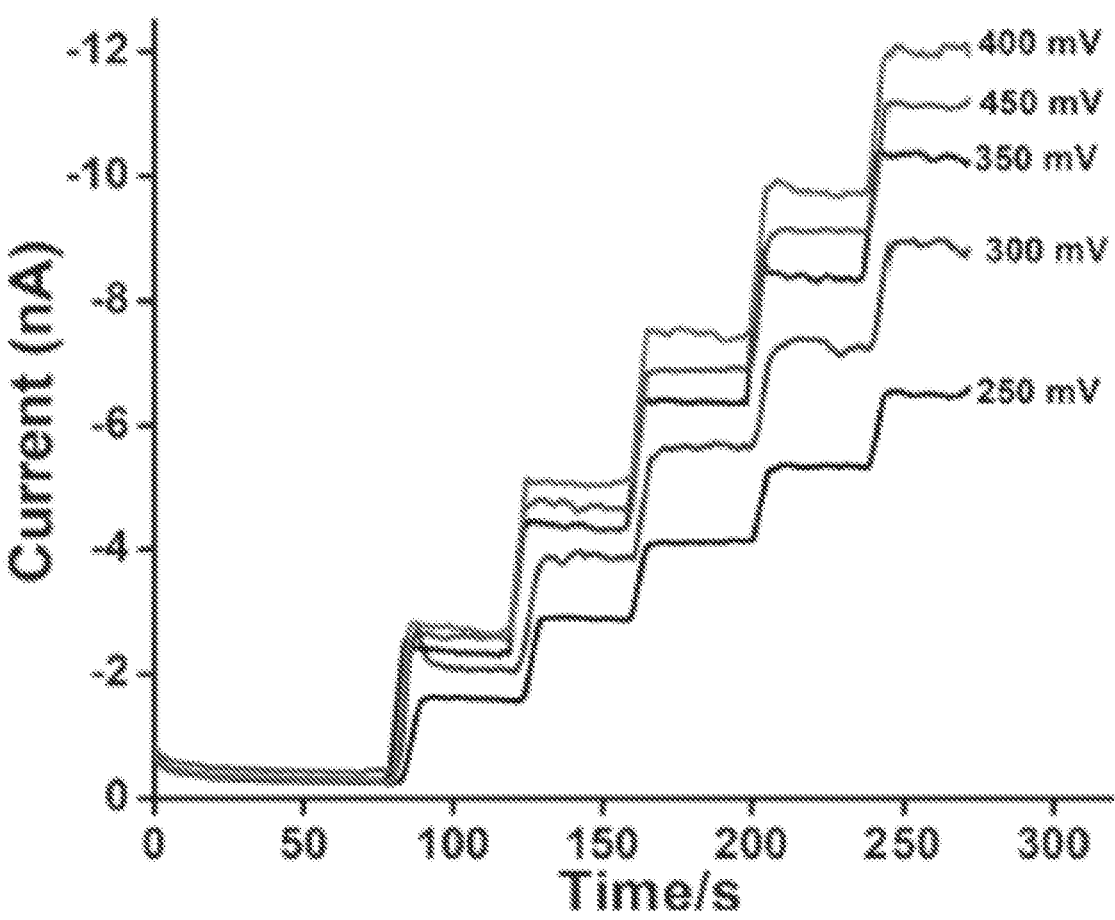
FIG. 12 shows amperometric current responses of CuNPs/HD-CNTf at different potentials from +250 mV to +450 mV with successive addition of 20 μM glucose into 0.1 M NaOH solution.

FIG. 12 shows the observed amperometric response of the CuNPs/HD-CNTf and it can be seen when the potential was increased from +250 to +400 mV, the electrode produces steady state current with gradual increment upon every addition of glucose. However, the highest oxidative current response was achieved at an applied potential of +400 mV and above that potential, current response was diminished, and one can see the significant difference between the current responses of 400 mV and 450 mV. This observation can be related to the probability of oxidation of other interfering species at higher applied potentials. Therefore, 400 mV was selected as an optimum applied potential for subsequent experiments.

Figures 13A, 13B:
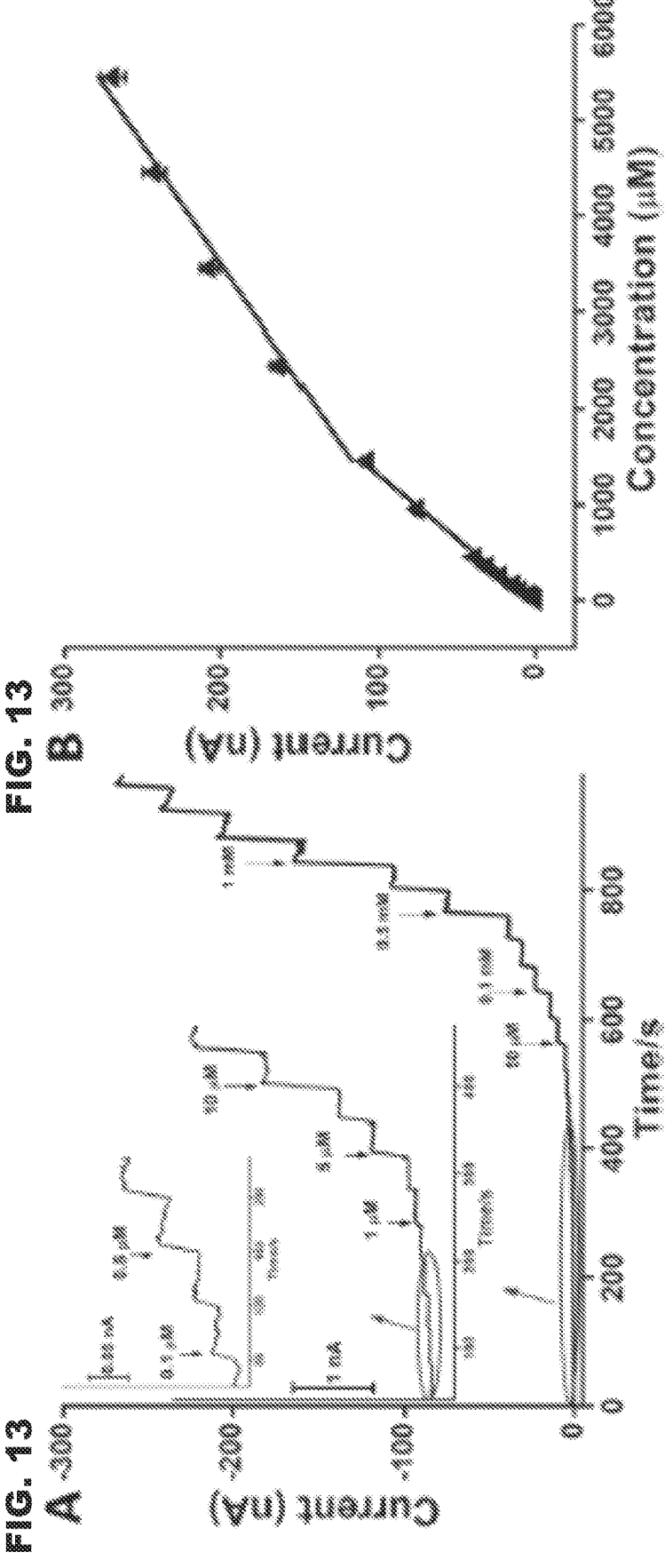
FIG. 13A shows amperometric response of CuNPs/HD-CNTf microsensor in 0.1 M NaOH solution to successive additions of glucose at concentrations from 100 nM to 1 mM at an applied voltage of 400 mV.
FIG. 13B shows corresponding calibration plot for the amperometric response of CuNPs/HD-CNTf.

The real-time amperometric detection of glucose on the CuNPs/HD-CNTf microsensor was carried out at a constant potential of +400 mV with the successive addition of various glucose concentrations (100 nM to 1 mM) into a stirred 0.1 M NaOH solution at 40 s intervals over multiple steps (FIG. 13A). After the addition of glucose, the current reached a steady state within 5 s, indicating that the microsensor had a fast electrocatalytic current response toward glucose electrooxidation. The observation of a significant current enhancement, even with the addition of only 0.1 μM glucose, confirmed the excellent electrocatalytic activity of CuNPs/HD-CNTf. As shown in FIG. 13B, the amperometric current response increased with increasing glucose concentration and the dependence of the oxidation current on the glucose concentration was found to have two linear ranges, which can be represented by Eqs. (11) and (12), respectively:

$$i_p(nA)=0.076[C_{glucose}(0{\cdot}1{-}1450\mu M)]+0.992 \quad (R2{=}0.997) \qquad [11]$$

$$i_p(nA)=0.040[C_{glucose}(1450{-}4450\mu M)]+58.915 \quad (R2{=}0.982) \qquad [12]$$

where $i_p$ is the current response and $C_{glucose}$ is the glucose concentration in 11M. The LOD was found to be 28 nM with a signal-to-noise ratio of 3. Based on the geometrical area of the electrode, the CuNPs/μ-ES dis-played sensitivities of approximately 1942 and 1022 $nA{\cdot}\mu M^{-1}{\cdot}cm^{-2}$ in the lower and higher concentration ranges, respectively. The decrease in sensitivity at higher concentrations can be attributed to intermediates formed during glucose electrooxidation being adsorbed on the electrode surface. The CuNPs greatly enhanced the electrocatalytic activity and promoted electron transfer during glucose oxidation. Furthermore, the micrometer diameter and length of the highly densified well-aligned CNTf led to an increase in conductivity and a decrease in the non-faradic charging current compared to randomly dispersed carbon nanomaterials on macroelectrode surfaces or composites. This behavior was confirmed by the 30 pA current obtained after spiking with 100 nM glucose (inset, FIG. 13A), which is only observable at a microelectrode surface with an extremely low non-faradic charging current. The synergetic effect of electrocatalytic CuNPs and HD-CNTf provided a suitable detection limit, good sensitivity, and a rapid response time for glucose electrooxidation. The observed results showed that the proposed sensor has excellent electrocatalytic properties for nonenzymatic glucose sensing in minute sample volumes or even a single drop of testing fluid.

Figure 14:
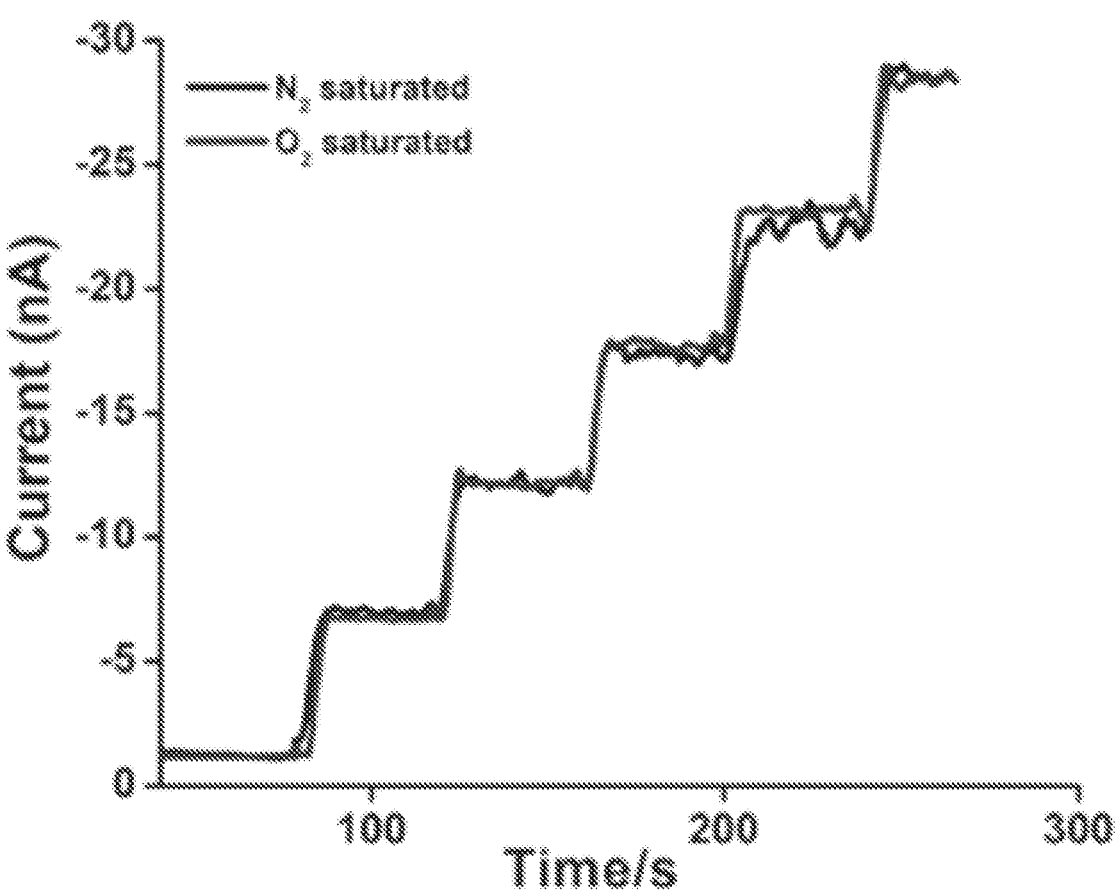
FIG. 14 shows amperometric response of the CuNPs/HD-CNTf to 50 μM glucose in air-saturated 0.1 M NaOH, and nitrogen-purged 0.1 M NaOH at an applied potential of +400 mV.

The enzymatic glucose determination relies on the oxygen, which can be considered a major disadvantage. The oxygen limitation may result in the error of glucose quantification. Therefore, the anti-interference properties of the proposed CuNPs/HD-CNTf microsensor was examined against oxygen in 0.1 M NaOH solution at an applied potential of 400 mV. As can be seen in FIG. 14, neither the presence nor the removal of oxygen affects the glucose sensing performance. The observed results reveal the oxygen-independent behavior of proposed CuNPs/HD-CNTf based glucose microsensor.

Figure 15:
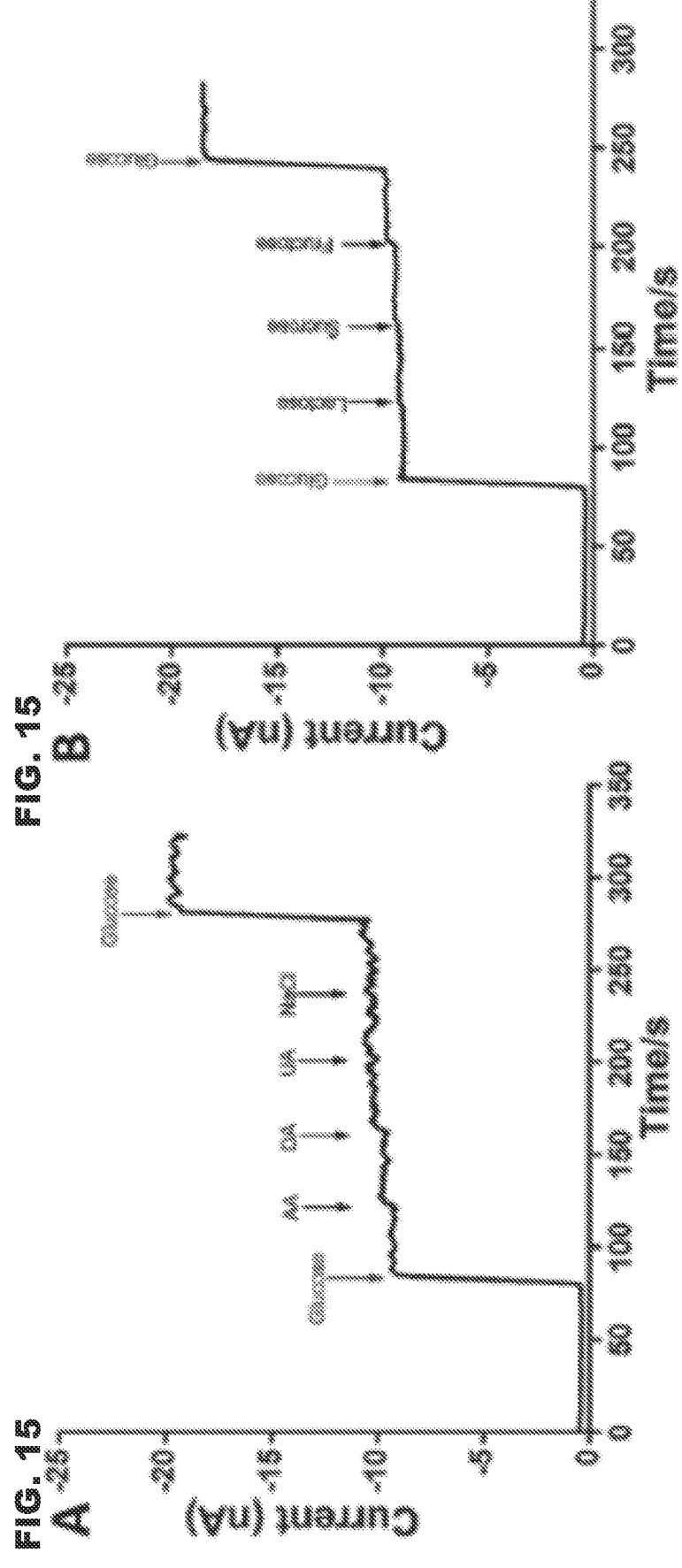
FIG. 15A shows amperometric response of the CuNPs/HD-CNTf to sequential injection of glucose (100 μM) and interfering species at 10 μM of AA, DA, UA, NaCl.
FIG. 15B shows the same as 15A at 10 μM lactose, sucrose and fructose in 0.1 M NaOH at an applied potential of +400 mV.

One of the major concerns in nonenzymatic glucose sensing is the electrochemical oxidation signals from interfering species. The electro-active interfering species such as ascorbic acid (AA), dopamine (DA), uric acid (UA), other carbohydrate compounds such as fructose, lactose and sucrose and common ions like $Na^+$ and $Cl^-$, normally coexist with glucose in human blood, and can affect the glucose quantification. Another concern common with noble metal-based nonenzymatic glucose sensors is the poisoning by chloride ions, causing them to lose their sensing activity. The poisoning is caused by the coordination of $Cl^-$ ions with metal/metallic oxides. Therefore, it is necessary to examine the electrochemical response of potential interfering species at CuNPs/HD-CNTf. Considering the normal glucose concentration in human blood sample is at least 30 times higher than physiological interferences, the amperometric experiments were performed at +400 mV in stirred 0.1 M NaOH, by adding 100 μM glucose, followed with successive addition of 10 μM interfering species (AA, DA, UA, NaCl, and fructose, lactose, and sucrose). As shown in FIG. 15A, a well-defined current response was observed towards glucose addition, whereas the sensor shows insignificant response to the addition of AA, DA, UA and NaCl interfering species compared to the response from glucose, indicating the good selectivity of the sensor. This selectivity might be attributed to isoelectric point 9.5, CuO on the surface of CuNPs in 0.1 M NaOH solution (pH 12.5) would carry some negative charge (Cu-0) and negatively charged ions such as AA and UA would be repelled by partially negatively charged metal oxide layer, thus resulting in good selectivity. The AA, DA and UA concentrations are known to be less than 1/30 that of glucose in blood. Therefore, the proposed microsensor can be used to detect glucose in blood with negligible interference from AA, DA and UA. The interference from other co-existing carbohydrates i.e., lactose, sucrose and fructose also did not show any significant changes in current response, FIG. 15B. Considering the fact that the presence of commonly co-existing sugars in serum i.e., 8.1 μM for fructose and 74 μM for sucrose are significantly lower than glucose i.e. 4-7 mM in healthy human serum and as both sugars would not introduce any significant signal in glucose detection, therefore, the blood sucrose and fructose is not anymore major concern for the proposed micro-sensor. Thus, it can be concluded that the CuNPs/μ-ES can be used for glucose detection in blood without being affected by potential interfering species.

To evaluate the stability of the proposed sensor, amperometric current response was recorded for stepwise addition of 0.2 mM glucose for 10 times in 0.1 M NaOH solution in a uniform time interval over a period of 15 days using five electrodes. The amperometric experiment was recorded daily up to 15 days and microsensors were stored under room temperature. The observed results reveal that the amperometric current response of glucose for all tested sensors remained unchanged for the first 7 days with relative standard deviation (RSD) under ±2.6%. After 7 days, deviation in peak current with gradual variation or increase in RSD value was observed for all five electrodes. For repeatability, the amperometric current response was recoded for stepwise addition of 0.2 mM glucose concentration. The amperometric experiment was recorded repetitively five times on proposed microsensor at an interval of one hour. From the calculation, the observed RSD of the current response was ±1.4%. Furthermore, the inter-electrode reproducibility was examined on five different microsensors under similar experimental conditions. The amperometric current response of glucose between five μ-ES varied only by a RSD of ±2.2%. The observed results confirm that the proposed sensor has excellent stability and reproducibility and can be used for practical applications.

Figure 16:
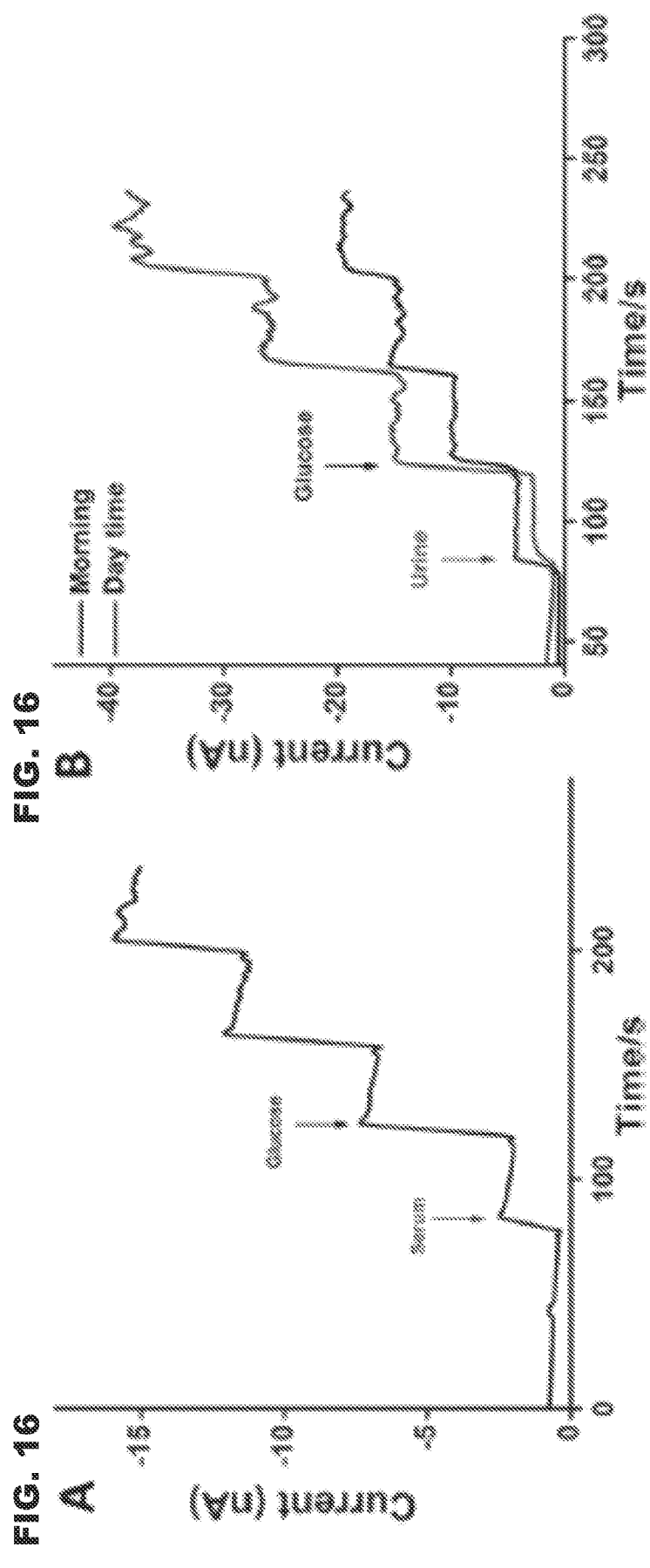
FIG. 16A shows amperometric current responses of CuNPs/HD-CNTf microsensor in 0.1 M NaOH solution at 400 mV for initial injections of serum with subsequent injections of 50 μM standard glucose solution.
FIG. 16B shows the same as 16A for urine sample with subsequent injections of 50 μM (Morning) and 100 μM (Day time) standard glucose solution.

To confirm the practical utility of the developed CuNP/μ-ES, glucose was determined in biological fluids (i.e., serum and urine samples). A 50 μL sample of serum was spiked into 25 mL of stirred 0.1 M NaOH solution and the current response was recorded at a constant potential of +400 mV. The observed amperogram showed a sharp increase in the amperometric peak current (FIG. 16A). Subsequently, this solution was spiked with a 50 μM standard glucose solution three times at 40 s intervals and the amperometric current response was recorded (FIG. 16A). The concentration of glucose in the spiked serum sample, as calculated using the calibration equation Eq. (11), was 9.31 μM, which agrees with the reported concentration in the serum sample (i.e., 4.55 mM, which gives a final concentration of 9.1 μM for 50 μL added to 25 mL NaOH solution). The measured concentrations of glucose in the spiked serum sample showed good reproducibility with a relative standard deviation (RSD) of ±3% (n=3). For exogenous spiking with a standard glucose solution at 10 μM, 50 μM and 100 μM concentrations, recovery values of 102.36%, 99.3%, and 101.3% were obtained, respectively. Although the serum sample was reported to contain significant amounts of other compounds, including uric acid (205 μM), proteins (albumin and globulin, 305.55 mM), sodium (146 mM), potassium (4 mM), chloride (101 mM), calcium (0.34 mM), and phosphorus (0.20 mM), no interference with the glucose oxidation peak current was observed.

Further, the applicability of developed microsensor for the analysis of diabetic patient urine samples was evaluated. The urine samples were collected in the early morning and in the afternoon. The afternoon urine sample was collected 3 h after measuring the blood glucose concentration (208 mg/dL, as measured using Dexcom G6). At a constant potential of +400 mV, 50 μL of urine sample was spiked into 25 mL of stirred 0.1 M NaOH solution, followed by the addition of a 50 μM and 100 μM standard glucose solution in morning and daytime urine samples, respectively. As shown by the amperograms in FIG. 17B, the peak current for glucose oxidation was higher in the early morning urine sample than in the afternoon urine sample, which might be due to the overnight accumulation of glucose in urine. The glucose concentrations in the urine samples, as calculated using the calibration equation, were 5.8 and 17.43 mM in the afternoon and early morning urine samples, respectively. The glucose recovery was in the range of 97.92-101.60% with an RSD of ±3%. The high accuracy and precision of the recovery results confirmed the reliability of the proposed CuNP/μ-ES for nonenzymatic glucose sensing in human biological samples.

In summary, a μ-ES was modified and employed for glucose detection. The μ-ES has three electrodes consisting of HD-CNTf cross-sections (~40 μm length), namely, a CuNP-deposited CNTf cross-section WE, a Ag/AgCl/Nafion™-coated CNTf cross-section QRE, and a bare CNTf cross-section CE. The μ-ES showed fast electron transfer kinetics in a redox analyte and the Ag/AgCl/Nafion™-coated CNTf QRE provided a sufficiently stable potential. The CuNP-deposited HD-CNTf WE showed excellent catalytic activity toward the electrooxidation of glucose in aqueous NaOH solution. The applicability of the developed CuNPs/HD-CNTf microsensor to nonenzymatic glucose detection was examined by CV and real-time amperometric measurements. These measurements revealed that the microsensor exhibits a low detection limit, wide quantification range, good precision, excellent selectivity, and a rapid response time. The performance of this microsensor can be attributed to the synergetic effect of electrocatalytic CuNPs and well-aligned HD-CNTf, which increases the conductivity with an extremely low non-faradic charging current. The developed microsensor was also free from chloride poisoning and the current response was independent of the oxygen concentration. Finally, the reported microsensor showed good accuracy and high precision for the analysis of healthy human serum and diabetic patient urine samples. Thus, the developed nonenzymatic CuNPs/μ-ES is suitable for the routine analysis of glucose in human biofluids, potentially even for single-droplet samples. The developed μ-ES, which can be used multiple times, also represents an advancement toward the development of microelectrode arrays using nonconventional and less-expensive techniques than lithography.

While particular aspects have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Any and all patents, published patent applications, and/or non-patent literature referenced or mentioned herein are incorporated by reference in their entirety.

The invention claimed is:

1. A micro electrode set (μ-ES) comprising:
a working electrode (WE),
a counter electrode (CE),
a reference electrode (RE), and
an insulating substrate in a plate shape having a first side, a second side, and a thickness, wherein:
the WE, CE, and RE each comprise a carbon nanotube fiber (CNTf) of a cylindrical length, an open circular distal end, and a closed circular proximal end; and
the WE, CE, RE are arranged in parallel along a thickness direction of the insulating substrate, and are embedded in the insulating substrate with the open circular distal ends exposed at the first side of the insulating substrate, and the closed circular proximal ends sealed at the second side of the insulating substrate such that a solution in contact with the μ-ES does not substantially contact the cylindrical length and the closed circular distal ends of the CNTfs.

2. The μ-ES of claim 1, wherein the RE further comprises a coating layer on the open circular distal end of the CNTf.

3. The μ-ES of claim 2, wherein the coating layer comprises silver and silver chloride.

4. The μ-ES of claim 3, wherein the coating layer further comprises sodium tetrafluoroethylene.

5. The μ-ES of claim 1, wherein the CNTfs of the WE, CE, and RE are highly densified CNTFs (HD-CNTfs).

6. The μ-ES of claim 1, wherein the insulating substrate comprises an epoxy.

7. The μ-ES of claim 1, wherein the closed circular proximal end of each of the CNTfs of the WE, CE, and RE is operably connected to an electrochemical sensor.

8. The μ-ES of claim 7, wherein the closed circular proximal end is connected to the electrochemical sensor through a silver paste.

9. The μ-ES of claim 1, wherein the distal end of the WE further comprises a copper layer.

10. The μ-ES of claim 9, wherein the copper layer comprises copper nanoparticles (NPs).

11. The μ-ES of claim 1, wherein the CNTf of the WE has a diameter of between 30 μm and 50 μm.

12. The μ-ES of claim 1, wherein the CNTf of the CE has a diameter of between 80 μm and 100 μm.

13. The μ-ES of claim 1, wherein the CNTf of the RE has a diameter of between 80 μm and 100 μm.

14. A method for detecting the presence of a target analyte in a test sample, comprising:

submerging the μ-ES of claim 1 in a solution, wherein the proximal ends of the WE, CE and RE are connected to an electrochemical sensor; and, adding a volume of the test sample to the solution, wherein a change in the electrochemical sensor confirms the presence of the target analyte in the test sample.

15. The method of claim 14, wherein the solution comprises one or more electrolytes in water.

16. The method of claim 14, wherein the target analyte is selected from dopamine, lead, glucose, furosemide, and β-nicotinamide adenine dinucleotide (NADH).

17. The method of claim 14, further comprising pre-calibrating the μ-ES to the target analyte.

18. The method of claim 17, wherein the μ-ES is pre-calibrated to determine the limiting current at the open distal end of the CNTfs of the WE.

19. The μ-ES of claim 1, wherein a diameter of the CNTf of the WE is less than a diameter of the CNTf of the CE.

20. The μ-ES of claim 1, wherein a diameter of the CNTf of the CE is substantially equal to a diameter of the CNTf of the RE.

* * * * *